US012312764B2

(12) United States Patent
Krieger et al.

(10) Patent No.: US 12,312,764 B2
(45) Date of Patent: May 27, 2025

(54) SELF-LEVELING LIFT ARM ASSEMBLY FOR POWER MACHINES

(71) Applicant: Doosan Bobcat North America, Inc., West Fargo, ND (US)

(72) Inventors: Daniel J. Krieger, Bismarck, ND (US); David Glasser, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 433 days.

(21) Appl. No.: 17/750,080

(22) Filed: May 20, 2022

(65) Prior Publication Data

US 2022/0372726 A1 Nov. 24, 2022

Related U.S. Application Data

(60) Provisional application No. 63/191,416, filed on May 21, 2021.

(51) Int. Cl.
*E02F 3/38* (2006.01)
*E02F 3/28* (2006.01)
(Continued)

(52) U.S. Cl.
CPC ................ *E02F 3/38* (2013.01); *E02F 3/283* (2013.01); *E02F 3/422* (2013.01); *E02F 9/2203* (2013.01);
(Continued)

(58) Field of Classification Search
CPC . E02F 3/283; E02F 3/38; E02F 3/3414; E02F 3/432
See application file for complete search history.

(56) References Cited

U.S. PATENT DOCUMENTS 2,710,699 A 6/1955 Dorkins
2,731,162 A 1/1956 Walstrom
(Continued)

FOREIGN PATENT DOCUMENTS

CN 209458211 U * 10/2019
DE 2337620 A1 2/1975
(Continued)

OTHER PUBLICATIONS

International Searching Authority. International Search Report and Written Opinion for counterpart application PCT/US2022/030361. Mailed on Oct. 11, 2022 (16 pgs.).

*Primary Examiner* — Abiy Teka
(74) *Attorney, Agent, or Firm* — QUARLES & BRADY LLP

(57) ABSTRACT

A lift arm assembly for a power machine can include a lift arm, an implement carrier, a lift cylinder that raises or lowers the lift arm, a leveling link, a tilt cylinder that causes the implement carrier to pivot relative to the lift arm, and an isolated hydraulic circuit. The isolated hydraulic circuit can include a follower cylinder that is mechanically synchronized with the lift cylinder, a leveling cylinder that can be pivotally secured to the leveling link and to the lift arm, a first conduit that can provide hydraulic flow between base ends of the follower and leveling cylinders, and a second conduit that can provide hydraulic flow between rod ends of the follower and leveling cylinders. Movement of the follower and leveling cylinders can be hydraulically synchronized by flow through the first and second conduits.

27 Claims, 15 Drawing Sheets

(51) Int. Cl.
*E02F 3/42* (2006.01)
*E02F 9/22* (2006.01)
*F15B 13/02* (2006.01)

(52) U.S. Cl.
CPC .......... *E02F 9/2267* (2013.01); *E02F 9/2271* (2013.01); *F15B 13/024* (2013.01); *E02F 9/2292* (2013.01)

(56) References Cited

U.S. PATENT DOCUMENTS

| | | | | |
|---|---|---|---|---|
| 3,216,597 | A | 11/1965 | Long | |
| 3,220,580 | A | 11/1965 | Long | |
| 3,220,581 | A | 11/1965 | Pedersen et al. | |
| 3,288,316 | A | 11/1966 | West | |
| 3,297,183 | A | 1/1967 | Klaviter et al. | |
| 3,487,968 | A | 1/1970 | Long | |
| 3,521,781 | A | 7/1970 | Holsinger et al. | |
| 3,858,675 | A | 1/1975 | Geis | |
| 3,967,744 | A | 7/1976 | Goyarts | |
| RE30,021 | E | 6/1979 | Olson et al. | |
| 4,382,743 | A | 5/1983 | Newell | |
| 4,632,630 | A | 12/1986 | Maki et al. | |
| 4,718,814 | A | 1/1988 | Addleman | |
| 4,759,452 | A | 7/1988 | Faint et al. | |
| 4,767,256 | A | 8/1988 | Knight | |
| 4,775,288 | A | 10/1988 | Dimitriu | |
| 4,822,237 | A | 4/1989 | Meyer et al. | |
| 4,828,125 | A | 5/1989 | Svedaker | |
| 4,964,778 | A | 10/1990 | Muto et al. | |
| 5,533,856 | A | 7/1996 | Friesen et al. | |
| 6,047,791 | A | 4/2000 | Hoebelheinrich | |
| 6,641,355 | B1 | 11/2003 | McInerney et al. | |
| 9,272,888 | B2 | 3/2016 | Owston | |
| 2004/0091347 | A1 | 5/2004 | Hackett et al. | |
| 2012/0251283 | A1 | 10/2012 | Violland | |
| 2019/0071844 | A1* | 3/2019 | Ohlsson | E02F 3/283 |
| 2020/0270846 | A1* | 8/2020 | Zent | E02F 3/433 |

FOREIGN PATENT DOCUMENTS

| | | | |
|---|---|---|---|
| DE | 19636649 | A1 | 3/1998 |
| DE | 202006019277 | U1 | 3/2007 |

* cited by examiner

SELF-LEVELING LIFT ARM ASSEMBLY FOR POWER MACHINES

CROSS-REFERENCE TO RELATED APPLICATIONS

This application claims priority to U.S. provisional application No. 63/191,416, titled "SELF-LEVELING LIFT ARM ASSEMBLY FOR POWER MACHINES" and filed May 21, 2021, the entirety of which is incorporated herein by reference.

BACKGROUND

This disclosure is directed toward power machines, including compact articulate loaders with extendable (e.g., telescoping) lift arm assemblies. More particularly, this disclosure is directed toward leveling systems for buckets, other implements, or implement carriers on lift arm assemblies of power machines. Power machines, for the purposes of this disclosure, include any type of machine that generates power to accomplish a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Different types of power machines, including articulated loaders, can include lift arm assemblies, such as may be used to execute work functions using implements secured to the lift arm assemblies. For example, hydraulic circuits can be operated to move a lift arm assembly to raise or lower, or otherwise manipulate, a bucket or other implement that is coupled to a lift arm of the lift arm assembly. It can be helpful to operators to provide control of the attitude of an implement (i.e., the orientation of the implement relative to ground, a horizontal plane, or another reference) during movement of a lift arm, so as to maintain the implement at an appropriate attitude (e.g., within an appropriate attitude range relative to ground).

The discussion above is merely provided for general background information and is not intended to be used as an aid in determining the scope of the claimed subject matter.

SUMMARY

Some examples according to this disclosure can provide improved operation of power machines relative to an attitude, and attitude changes, of an implement carrier or implement as a lift arm is raised and lowered. For example, some embodiments can include a set of hydraulically synchronized cylinders and a set of mechanically synchronized cylinders that form part of, and can be actuated to move, linkages of different configurations, to provide improved automatic leveling of a bucket or other implement during operation of a lift arm.

Some examples of the disclosure provide a lift arm assembly, including a lift arm that can be pivotally secured (or configured to be secured) at a first end to a main frame of a power machine, an implement carrier that can be pivotally secured to a second end of the lift arm, a lift cylinder that can be pivotally secured at a first end to the lift arm and pivotally secured at a second end to the main frame, so that extending or retracting the lift cylinder raises or lowers the lift arm, a leveling link that can be pivotally secured at a first end to the lift arm, and a tilt cylinder that can be pivotally secured at a first end to an implement carrier and pivotally secured at a second end to the leveling link, so that operation of the tilt cylinder causes the implement carrier to pivot relative to the lift arm. The lift arm assembly can further include an isolated hydraulic circuit that can include a follower cylinder that can be pivotally secured at a first end to the lift arm and pivotally secured at a second end to the main frame, so that the follower cylinder is mechanically synchronized with the lift cylinder, a leveling cylinder that can be pivotally secured at a first end to the lift arm and pivotally secured at a second end to the leveling link, a first conduit that can provide hydraulic flow between a base end of the follower cylinder and a base end of the leveling cylinder, and a second conduit that can provide hydraulic flow between a rod end of the follower cylinder and a rod end of the leveling cylinder, so that movement of the follower and leveling cylinders is hydraulically synchronized by flow through the first and second conduits.

In some examples, a lift arm assembly can include a leveling cylinder and a tilt cylinder that are pivotally secured to a leveling link along a common pivot axis.

In some examples, a lift arm assembly can include an isolated hydraulic circuit that can be configured to cause a leveling cylinder to extend when a follower cylinder retracts, and to retract when the follower cylinder extends.

In some examples, a lift arm assembly can include a leveling link, a leveling cylinder, and an implement carrier that are pivotally secured to a second end of the lift arm at two or more pivot axes, and a first end of the lift cylinder and a first end of the follower cylinder can be pivotally secured to the lift arm between the main frame and the two or more pivot axes. In some examples, the first end of the follower cylinder can be pivotally secured to the lift arm with a common pivot axis with the first end of the lift cylinder. In some examples, the first end of the follower cylinder can be pivotally secured to the lift arm between the first end of the lift cylinder and a first end of the lift arm.

In some examples, with a lift arm of a lift arm assembly in a fully lowered position, an elongate direction of a leveling link can extend, from a first end of the leveling link to a second end of the leveling link, away from an implement carrier. In some examples, a hydraulically synchronized movement of a follower cylinder and a leveling cylinder of an isolated hydraulic circuit of the lift arm assembly can cause the second end of the leveling link to pivot about the first end of the leveling link toward the implement carrier as the lift arm is raised from the fully lowered position. In some examples, over a range of movement of the lift arm between the fully lowered position and a fully raised position, the elongate direction of the leveling link can maintain an acute angle relative to an elongate direction of the lift arm that extends between the first and second ends of the lift arm. In some examples, the first end of the leveling link can be pivotally secured to a lower side of the lift arm, and the tilt cylinder and the leveling cylinder can be pivotally secured to the leveling link at a second end of the leveling link that can extend above the lift arm.

In some examples, a lift arm assembly can include a leveling link that can be pivotally secured to a lower side of a lift arm, an implement carrier that can be pivotally secured to the lower side of the lift arm, and a leveling cylinder that can be pivotally secured to an upper side of the lift arm.

In some examples, a lift arm assembly can include a leveling cylinder and an implement carrier that can be pivotally secured to a lift arm along a common pivot axis.

In some examples, a lift arm assembly can include an isolated hydraulic circuit that includes a drain valve that can be configured to selectively release fluid from a leveling cylinder and a follower cylinder.

In some examples, a lift arm assembly can include a tilt cylinder that can be configured to pivot an implement carrier relative to a lift arm so that the implement carrier operates as a first bell crank, and a leveling cylinder that can be configured to pivot a leveling link relative to the lift arm so that the leveling link operates as a second bell crank. In some examples, extension of the tilt cylinder can cause the implement carrier, as the first bell crank, to pivot in a first rotational direction, and extension of the leveling cylinder, by retraction of the follower cylinder, can cause the leveling link, as the second bell crank, to pivot opposite the first rotational direction.

Some examples of the disclosure also provide a lift arm assembly, including a lift arm that is pivotally secured to a main frame of a power machine and a lift cylinder that is pivotally secured at a first end to the lift arm and pivotally secured at a second end to the main frame, so that extending or retracting the lift cylinder raises or lowers the lift arm. A follower cylinder can be pivotally secured at a first end to the lift arm and pivotally secured at a second end to the main frame, so that the follower cylinder is mechanically synchronized with the lift cylinder. A first bell crank arrangement supported by the lift arm can include: the lift arm; a leveling link that is pivotally secured at a first end to the lift arm; and a leveling cylinder. The leveling cylinder can be hydraulically synchronized with the follower cylinder, pivotally secured at a first end to the lift arm, and pivotally secured at a second end to a second end of the leveling link, so that operation of the leveling cylinder, as caused by operation of the follower cylinder, causes the leveling link to pivot relative to the lift arm. A second bell crank arrangement supported by the lift arm can include: the lift arm, the leveling link, and the leveling cylinder, collectively; an implement carrier that is pivotally secured to a second end of the lift arm; and a tilt cylinder. The tilt cylinder can be pivotally secured at a first end to the implement carrier and pivotally secured at a second end to the second end of the leveling link, so that operation of the tilt cylinder causes the implement carrier to pivot relative to the lift arm, the leveling link, and the leveling cylinder, collectively.

In some examples, a lift arm assembly can include a leveling cylinder of a first bell crank arrangement and a tilt cylinder of a second bell crank arrangement that can be pivotally secured to a leveling link along a common pivot axis.

Some examples of the disclosure provide a power machine that can include a main frame, a power source, a hydraulic work circuit that can be configured to power hydraulic operations with one or more pumps using power from the power source, and a lift arm structure. The lift arm structure can include a main lift arm portion pivotally secured at a first end to a main frame of a power machine, an extendable lift arm portion that is slidably supported by the main lift arm portion for extension and retraction relative to the main lift arm portion, and an implement carrier that is pivotally secured to a second end of the extendable lift arm portion. A lift cylinder can be pivotally secured at a first end to the main lift arm portion and pivotally secured at a second end to the main frame, so that extension or retracting the lift cylinder raises or lowers the lift arm structure. A leveling link can be pivotally secured at a first end to the extendable lift arm portion. A tilt cylinder can be pivotally secured at a first end to the implement carrier and pivotally secured at a second end to a second end of the leveling link, so that operation of the tilt cylinder causes the implement carrier to pivot relative to the extendable lift arm portion. A follower cylinder can be pivotally secured at a first end to the main lift arm portion and pivotally secured at a second end to the main frame, so that the follower cylinder is mechanically synchronized with the lift cylinder. A leveling cylinder can be hydraulically synchronized with the follower cylinder, pivotally secured at a first end to the extendable lift arm portion and pivotally secured at a second end to the second end of the leveling link, so that operation of the lift cylinder by the one or more pumps causes synchronized operation of the leveling cylinder.

In some examples, for an entire range of motion of an extendable lift arm portion of a lift arm structure between a fully retracted position and a fully extended position, one or more locations at which a leveling link, a leveling cylinder, and an implement carrier are pivotally secured to the extendable lift arm portion can be positioned beyond a second end of a main lift arm portion, relative to a direction from a first end of the main lift arm portion toward a second end of the main lift arm portion. In some examples, the leveling link can be pivotally secured to a lower side of the lift arm and the leveling cylinder can be pivotally secured to an upper side of the lift arm. In some examples, the leveling link can be formed from a first side plate and a second side plate that collectively pivotally support the leveling cylinder and a tilt cylinder, and a torque tube can extend between the first and second side plates. With the lift arm structure in a fully lowered configuration, the torque tube can be between the main lift arm portion and the leveling and tilt cylinders and/or one of rearward of or intersected by a line of action of the leveling link that extends between pivotally secured first and second ends of the leveling link.

Some examples of the disclosure provide a hydraulic system for a lift arm assembly, including a follower cylinder and a leveling cylinder. A base end hydraulic flow path can extend between a base end of the follower cylinder and a base end of the leveling cylinder. A rod end hydraulic flow path can extend between a rod end of the follower cylinder and a rod end of the leveling cylinder. A first outlet hydraulic flow path can extend from the base end hydraulic flow path. A second outlet hydraulic flow path can extend from the rod end hydraulic flow path. The first and second outlet hydraulic flow paths can connect the base end and rod end hydraulic flow paths, respectively, to tank, via one or more pressure relief valves.

In some examples, a hydraulic system for a lift arm assembly can include a follower cylinder, a leveling cylinder, a base-end hydraulic flow path, and a rod-end hydraulic flow path that can form part of an isolated hydraulic circuit that can be configured to extend and retract the leveling cylinder based on movement of the follower cylinder. In some examples, the hydraulic system can further include a flow source that can be configured to provide charge hydraulic flow to the follower and leveling cylinders via the base-end and rod-end hydraulic flow paths. In some examples, the flow source can provide charge hydraulic flow to the base-end hydraulic flow path via a first outlet hydraulic flow path and a first one-way valve and can provide charge hydraulic flow to the rod-end hydraulic flow path via a second outlet hydraulic flow path and a second one-way valve. In some examples, the hydraulic system can further include a third one-way valve along the first outlet hydraulic flow path and a fourth one-way valve along the second outlet hydraulic flow path. An inlet of the charge hydraulic flow from the flow source into the first outlet hydraulic flow path can be upstream of the third one-way valve, relative to flow to tank, and an inlet of the charge hydraulic flow from the flow source into the second outlet hydraulic flow path can be upstream of the fourth one-way valve, relative to flow to tank. In some examples, the hydraulic system can include one or more pressure relief valves that can include at least one pressure relief valve that receives flow from and regulates pressure within each of the first and second outlet hydraulic flow paths. In some examples, the hydraulic system can include a drain valve that can be configured to selectively release fluid from the follower and leveling cylinders to bypass at least one of one or more pressure relief valves.

In some examples, a hydraulic system for a lift arm assembly can include first and second outlet hydraulic flow paths that can connect base-end and rod-end hydraulic flow paths to tank via a shared pressure relief valve.

Some examples of the disclosure also provide a hydraulic system for a lift arm assembly, including an isolated hydraulic circuit, a first hydraulic arrangement, and a second hydraulic arrangement. The isolated hydraulic circuit can include a follower cylinder, a leveling cylinder, a first conduit that can directly connect a base end of the follower cylinder and a base end of the leveling cylinder, and a second conduit that can directly connect a rod end of the follower cylinder and a rod end of the leveling cylinder. The first hydraulic arrangement can connect the first conduit to a flow source and to tank, and the second hydraulic arrangement can connect the second conduit to the charge pump and to tank.

This Summary and the Abstract are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter.

DRAWINGS

DESCRIPTION

Figure 1:
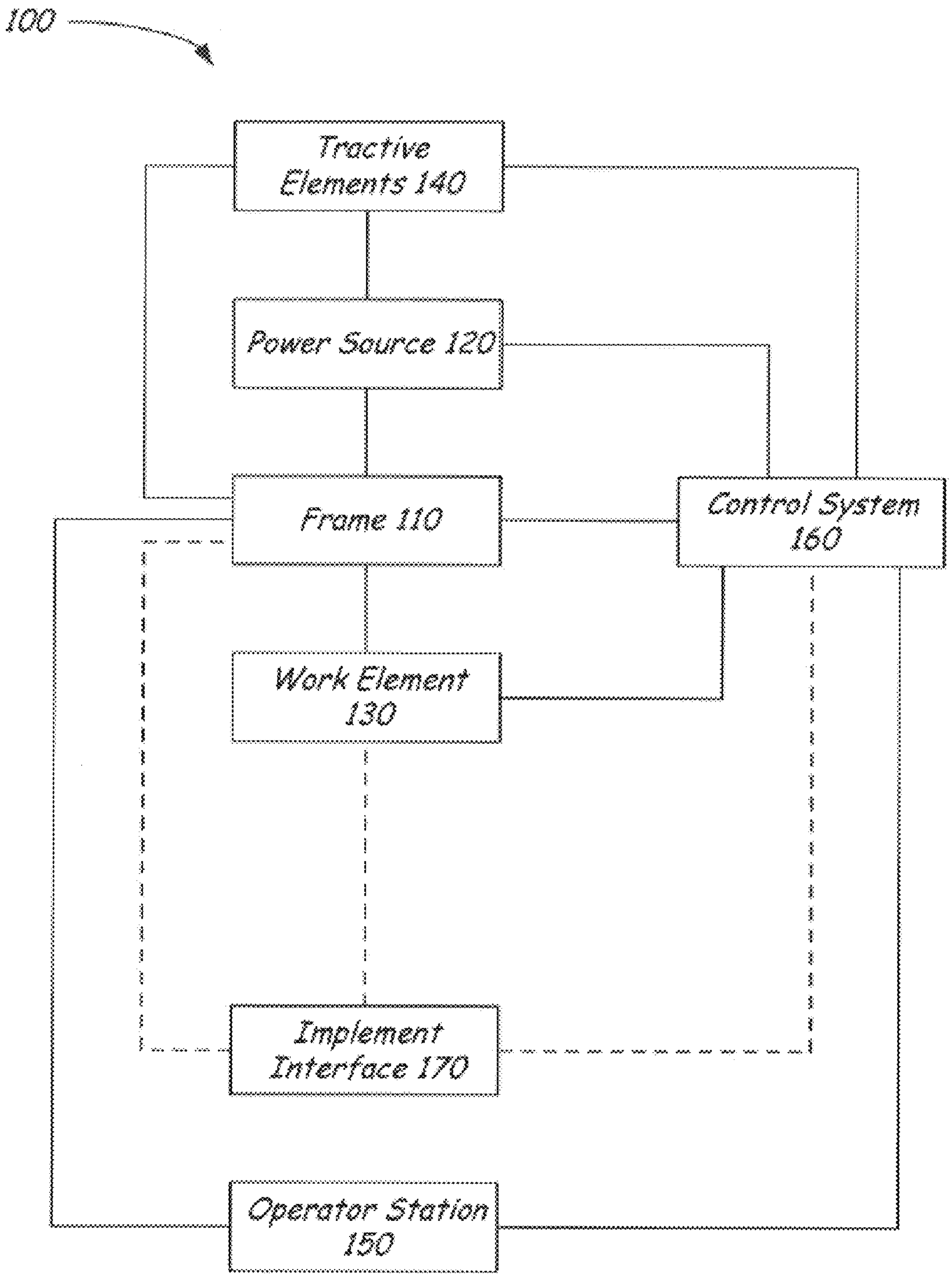
FIG. 1 is a block diagram illustrating functional systems of a representative power machine on which examples of the present disclosure can be advantageously practiced.

The concepts disclosed in this discussion are described and illustrated by referring to exemplary examples. These concepts, however, are not limited in their application to the details of construction and the arrangement of components in the illustrative examples and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items. Throughout the disclosure, the terms "about" and "approximately" refer to a range of values ±5% of the number that each term precedes.

As used herein, "geometrically parallel" refers to components that are arranged along parallel reference lines or planes. For example, two or more geometrically parallel cylinders may be arranged with parallel lines of action for extension and retraction.

Also as used herein, "mechanically synchronized" refers to components that are configured to move simultaneously based on a common force input. In particular, two or more mechanically synchronized cylinders are configured to extend or retract in unison based on a common input. In some cases, a first component may be moved under power to cause a mechanically synchronized movement of a second component. For example, first hydraulic cylinder can be moved under power to cause a mechanically synchronized movement of a second hydraulic cylinder via a mechanical tie between the cylinders. In some installations, mechanically synchronized cylinders may extend or retract at different rates, or with different respective stroke lengths. In some installations, mechanically synchronized cylinders may be configured to extend or retract at proportional rates, so that movement of a first cylinder is proportional to movement of a second cylinder.

Also as used herein, "hydraulically synchronized" refers to components that are hydraulically linked so that movement of a first component causes movement of a second component via hydraulic action. For example, two or more hydraulic synchronized cylinders may be incorporated into a hydraulic circuit so that extension/retraction of one cylinder results in a synchronized retraction/extension (or extension/retraction) of the other cylinder(s). Generally, hydraulically synchronized components (e.g., cylinders) can be included in one or more shared isolated hydraulic circuits, to provide synchronizing hydraulic flow between the components.

In some cases, hydraulically synchronized cylinders can be "directly" synchronous, so that hydraulic connections cause a first cylinder to extend or retract based on extension or retraction, respectively, of a second cylinder. In some cases, hydraulically synchronized cylinders can be "inversely" synchronous, so that hydraulic connections cause the cylinders to extend or retract oppositely to each other. For example, rod ends of two cylinders may be connected via a first hydraulic line and base ends of the two cylinders may be connected by a second hydraulic line, as part of an isolated hydraulic circuit. Accordingly, fluid transfer between the rod ends and the corresponding fluid transfer between the base ends can cause the second cylinder to extend as the first cylinder retracts (and vice versa).

Also as used herein, an "isolated" hydraulic circuit is a hydraulic circuit that is arranged to contain pressure but does not include an active pump, or flow connections that allow a pressure source outside of the circuit to operate components (e.g., cylinders) within the hydraulic circuit. For example, some isolated hydraulic circuits may include one or more hydraulic actuators (e.g., cylinders), one or more one-way valves (e.g., various known check valves), or one or more pressure relief valves (e.g., of various known configurations) to prevent flow out of the hydraulic circuit, at least for pressures below a set point. In some cases, an isolated hydraulic circuit may be connected to a charge pump or other flow source that is configured to provide pressurized fluid (e.g., via spring-biased check-valves), to refill the isolated hydraulic circuit or to help increase pressure within the hydraulic circuit toward a set point. However, such a charge pump (or other source) is generally not configured to move an actuator within the isolated hydraulic circuit. In some cases, an isolated hydraulic circuit can define a constant volume of hydraulic fluid that can be contained by the isolated hydraulic circuit, and that can include the internal volume of one or more hydraulically synchronized cylinders.

Conventional lift arm structures are generally configured to move an implement, e.g., a bucket, by raising and lowering a distal end of the lift arm. However, raising and lowering a lift arm tends to also change an attitude of an implement attached to the lift arm. In some cases, this lift-induced tilting of the implement may cause undesirable results. For example, change in attitude of a bucket can result in rollout or other undesired spillage of bucket contents.

Examples of the present disclosure can address these problems, and others, including by providing a self-leveling lift arm assembly. For example, the disclosed arrangements of synchronized cylinders, including lift and tilt cylinders, and associated structural links can help to counteract lift-induced tilting of an implement or implement carrier without requiring tilt-correction input from an operator. Some examples can be adapted in particular to lift arm structures with telescoping lift arms, including via appropriate structural arrangements of lift arm portions, leveling links, and pivot axes for various cylinders or structural members.

Generally, examples of the disclosure include a hydraulic follower cylinder that is mechanically synchronized with a hydraulic lift cylinder for a lift arm. The follower cylinder can also be hydraulically synchronized with a hydraulic leveling cylinder (e.g., inversely), so that the leveling cylinder caused to extend or retract by movement of the lift arm, via corresponding hydraulic flow to and from the follower cylinder. The leveling cylinder can be pivotally secured to the lift arm and to a leveling link. The leveling link can also be pivotally secured to the lift arm, as well as pivotally secured to a tilt cylinder. The tilt cylinder can also be pivotally secured to an implement carrier, so that the tilt cylinder can directly change an attitude of the implement carrier relative to the lift arm (e.g., by extending or retracting, or via movement of the leveling link).

Accordingly, as the lift cylinder raises and lowers the lift arm, the follower cylinder synchronously extends and retracts, which causes a corresponding synchronous movement of the leveling cylinder. Movement of the leveling cylinder in turn causes the leveling link to pivot relative to the lift arm, which moves the tilt cylinder, as a whole (e.g., at any given fixed stroke location), to pivot the implement carrier. Thus, the attitude of the implement carrier can be adjusted automatically based on movement of the lift arm, even in the absence of any commanded extension or retraction of the tilt cylinder. In some cases, this may substantially reduce undesired tilting of an implement during lift arm operation.

In some examples, a lift arm assembly according to the disclosure can include a telescoping lift arm assembly that includes a main lift arm portion, an extendable lift arm portion configured to extend and retract (e.g., move telescopically) relative to the main lift arm portion, and an implement or implement carrier supported by the extendable lift arm portion (e.g., a bucket, supported by an implement carrier that is coupled to a distal end of the extendable lift arm portion). A lift cylinder can be pivotally secured at one end (e.g., a base end) to a main frame of the power machine, and can be pivotally secured at another end (e.g., a rod end) to the main lift arm portion. A follower cylinder can also be pivotally secured to the main frame and to the main lift arm portion, so that the follower and lift cylinders are mechanically synchronized with each other and with movement of the main lift arm portion.

In some examples, a telescoping lift arm assembly can further include a leveling cylinder and a tilt cylinder. The leveling cylinder can be pivotally connected to the extendable lift arm portion and to a leveling link, which can also be pivotally secured to the extendable lift arm portion. The tilt cylinder can be pivotally connected to both the leveling link and to an implement carrier that is also pivotally secured to the extendable lift arm. Further, the leveling cylinder can be hydraulically synchronized with the follower cylinder to provide automatic tilt adjustments during operation of the lift arm assembly. For example, with an inversely hydraulically synchronized arrangement, extension of the follower cylinder, as corresponds to the main lift arm portion being raised, causes a retraction of the leveling cylinder. For a given stroke position of the tilt cylinder, this synchronized retraction of the leveling cylinder can cause the leveling link to pivot forward relative to the extendable lift arm portion, so that the leveling link, via the tilt cylinder, causes the implement carrier to also pivot forward relative to the extendable lift arm portion. Thus, a rearward rotational change in attitude of an implement carrier, as is typically caused by the raising of an associated lift arm, can be counteracted (at least in part). Further, a reverse of the sequence discussed above can also counteract attitude changes for an implement during the lowering of a lift arm.

In some examples, as also detailed below, particular relative arrangements of pivot axes, angular orientation of cylinders or links, and other structural configurations for a lift arm assembly with automatic tilt-leveling can be particularly beneficial. In some arrangements, it may be beneficial for a tilt cylinder and a leveling cylinder to be pivotally connected to a leveling link along a common pivot axis (e.g., using a common pivot pin), although other arrangements are also possible. In some arrangements, a lift cylinder and a follower cylinder may similarly share a common pivot axis at a main frame or at a lift arm, although spaced-apart pivot axes at a main frame or at a lift arm may be beneficial in some cases. In some arrangements, a leveling link, a leveling cylinder, a tilt cylinder, and an implement carrier can be configured to effectively provide two opposing bell crank assemblies, with common actuators and links, to provide automatic leveling for the implement carrier.

In some arrangements, a leveling link can be pivotally secured to a lower side of a distal end of a lift arm and a leveling cylinder can be pivotally secured to an upper side of the distal end of the lift arm. In some arrangements, a leveling cylinder can be pivotally secured to a lift arm between a distal end of the lift arm and a location at which a leveling link is pivotally secured to the lift arm. In some arrangements, a leveling cylinder and a leveling link can be pivotally secured to an extendable portion of a lift arm, between a distal end of the extendable portion and a distal end of a main portion of the lift arm that supports the extendable portion relative to a main frame of a power machine.

The context and particulars of this discussion are presented as examples only. For example, examples of the disclosed invention can be configured in various ways, including with different materials and arrangements of elements. Similarly, examples of the invention can be used with various types of power equipment, including loaders, excavators, utility vehicles, tractors, and trenchers, or other types of power equipment other than those expressly illustrated or described herein.

Figure 2:
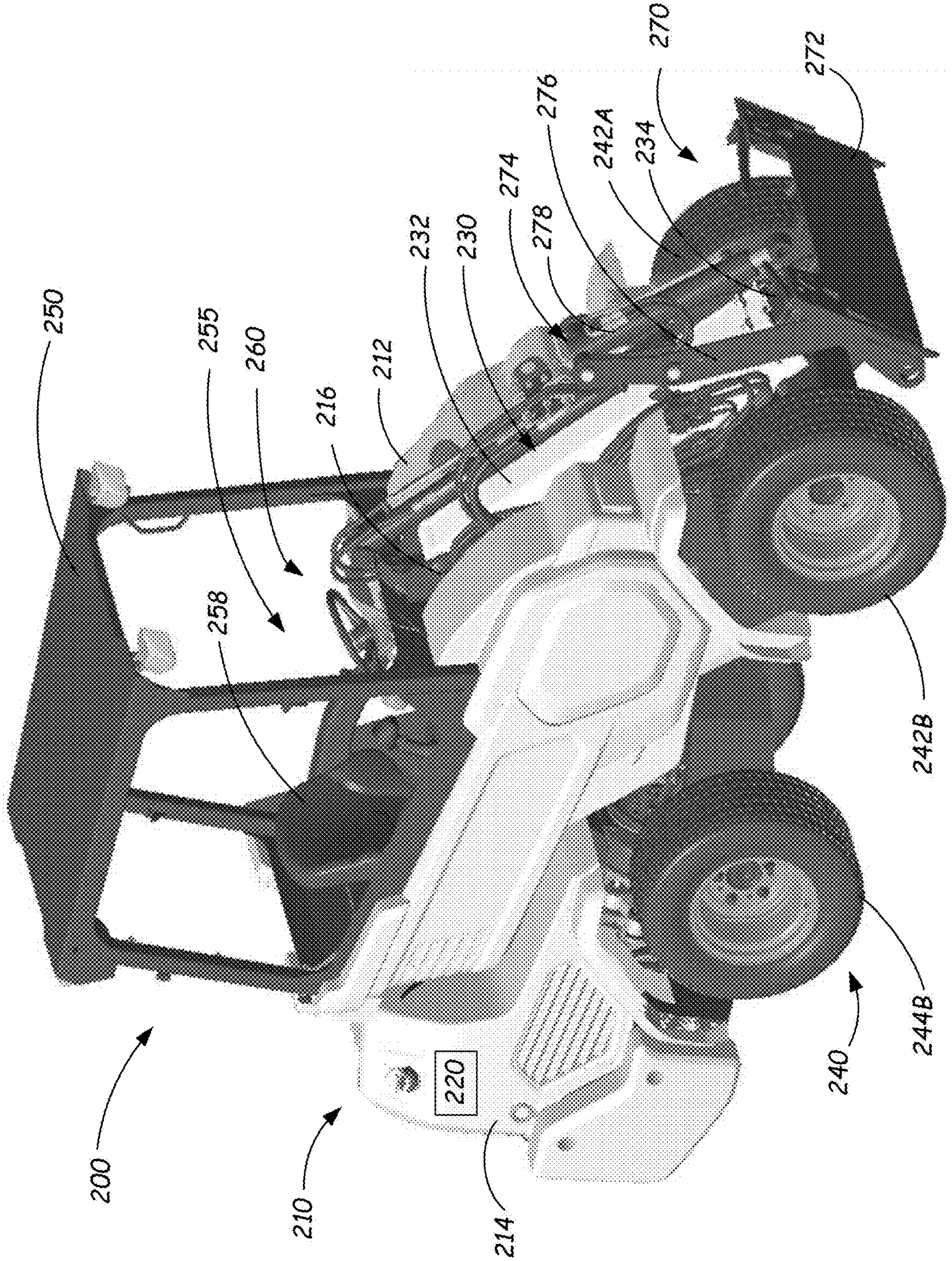
FIG. 2 is a perspective view showing generally a front of a power machine in the form of a compact loader on which examples disclosed in this specification can be advantageously practiced.
Figure 3:
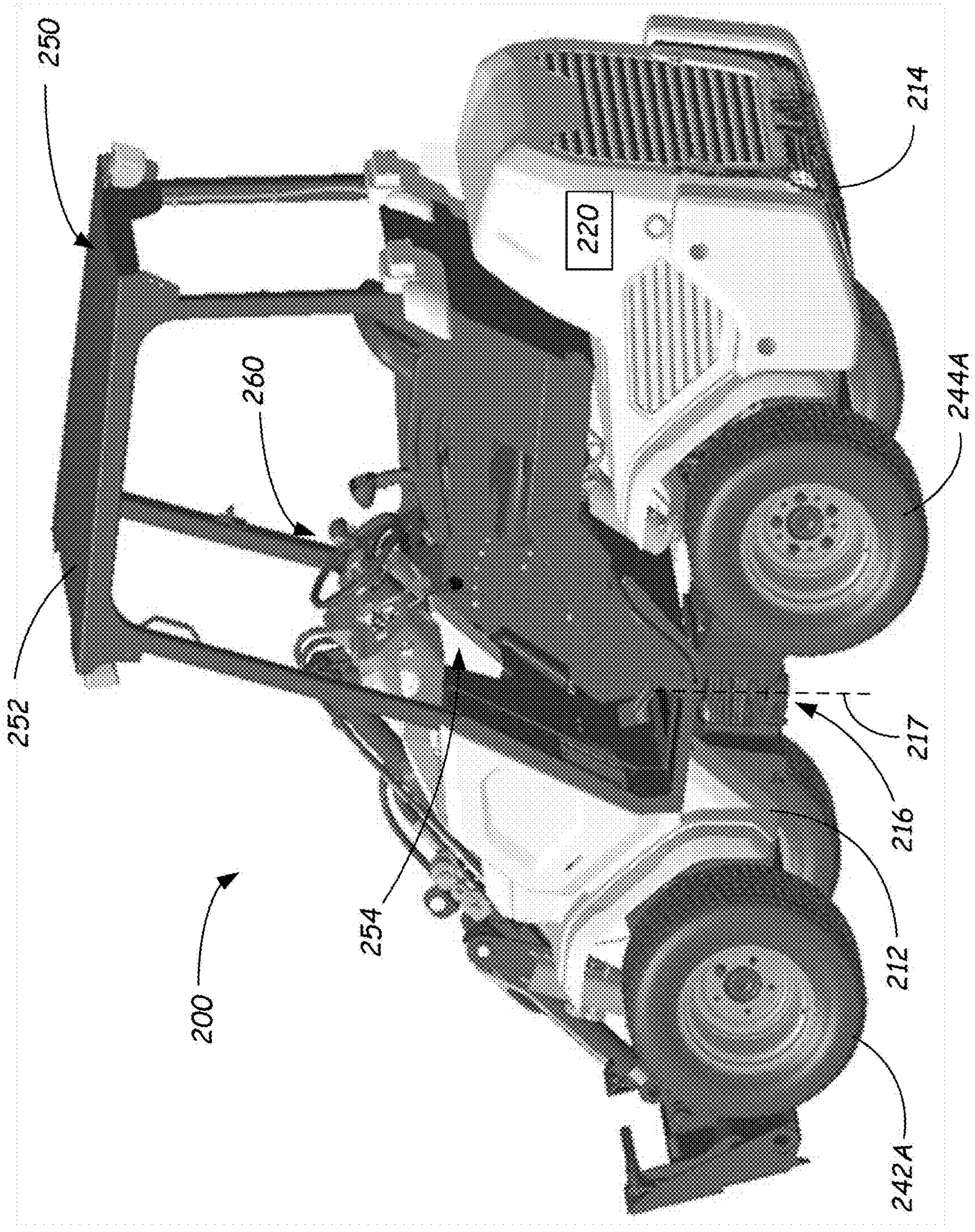
FIG. 3 is a perspective view showing generally a back of the power machine shown in FIG. 2.

These concepts can be practiced on various power machines, as will be described below. A representative power machine on which the examples can be practiced is illustrated in diagram form in FIG. 1 and one example of such a power machine is illustrated in FIGS. 2 and 3 and described below before any examples are disclosed. For the sake of brevity, only one power machine is discussed. However, as mentioned above, the examples below can be practiced on any of a number of power machines, including power machines of different types from the representative power machine shown in FIGS. 2 and 3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

The examples of the disclosure are presented below in the context of articulated loaders, with lift arm assembly components arranged on and secured to a frame. In some examples, lift arm assembly components and related systems according to the disclosure can be used with other types of power machines, including with non-articulated power machines with tractive elements other than tracks (e.g., wheels).

FIG. 1 illustrates a block diagram of the basic systems of a power machine 100 upon which the examples discussed below can be advantageously incorporated and which can be any of a number of different types of power machines. The block diagram of FIG. 1 identifies various systems on the power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface, and an operator station 150 that provides an operating position for controlling the work elements of the power machine 100. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. In some instances, the implement can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, the implement carrier is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work elements with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as a work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether they have operator compartments, operator positions or neither, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both the power machine and any implement to which is it coupled) that is capable of controlling at least some of the operator-controlled functions on the power machine.

FIGS. 2 and 3 illustrate a loader 200, which is one particular example of a power machine of the type illustrated in FIG. 1 where the embodiments discussed below can be advantageously employed. Loader 200 is an articulated loader with a front mounted lift arm assembly 230, which in this example is a telescopic lift arm. Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. The description herein of loader 200 with references to FIGS. 2 and 3 provides an illustration of the environment in which the embodiments discussed below and this description should not be considered limiting especially as to the description of features of the loader 200 that are not essential to the disclosed embodiments. Such features may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that can generate or otherwise provide power for operating various functions on the power machine. Frame 210 also supports a work element in the form of lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270 that includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices to cause the power machine to perform various work functions. Cab 250 includes a canopy 252 that provides a roof for the operator compartment and is configured to have an entry 254 on one side of the seat (in the example shown in FIG. 3, the left side) to allow for an operator to enter and exit the cab. Although cab 250 as shown does not include any windows or doors, a door or windows can be provided.

The operator station 255 includes an operator seat 258 and the various operation input devices 260, including control levers that an operator can manipulate to control various machine functions. Operator input devices can include a steering wheel, buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive system 240, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such as walk behind loaders may not have a cab nor an operator compartment, nor a seat. The operator position on such loaders is generally defined relative to a position where an operator is best suited to manipulate operator input devices.

Various power machines that can include and/or interact with the embodiments discussed below can have various different frame components that support various work elements. The elements of frame 210 discussed herein are provided for illustrative purposes and should not be considered to be the only type of frame that a power machine on which the embodiments can be practiced can employ. As mentioned above, loader 200 is an articulated loader and as such has two frame members that are pivotally coupled together at an articulation joint. For the purposes of this document, frame 210 refers to the entire frame of the loader. Frame 210 of loader 200 includes a front frame member 212 and a rear frame member 214. The front and rear frame members 212, 214 are coupled together at an articulation joint 216. Actuators (not shown) are provided to rotate the front and rear frame members 212, 214 relative to each other about an axis 217 to accomplish a turn.

The front frame member 212 supports and is operably coupled to the lift arm 230 at joint 216. A lift arm cylinder (not shown, positioned beneath the lift arm 230) is coupled to the front frame member 212 and the lift arm 230 and is operable to raise and lower the lift arm under power. The front frame member 212 also supports front wheels 242A, 242B. Front wheels 242A, 242B are mounted to rigid axles (the axles do not pivot with respect to the front frame member 212). The cab 250 is also supported by the front frame member 212 so that when the front frame member 212 articulates with respect to the rear frame member 214, the cab 250 moves with the front frame member 212 so that it will swing out to either side relative to the rear frame member 214, depending on which way the loader 200 is being steered.

The rear frame member 214 supports various components of the power system 220 including an internal combustion engine. In addition, one or more hydraulic pumps are coupled to the engine and supported by the rear frame member 214. The hydraulic pumps are part of a power conversion system to convert power from the engine into a form that can be used by actuators (such as cylinders and drive motors) on the loader 200. Power system 220 is discussed in more detail below. In addition, rear wheels 244A, 244B are mounted to rigid axles that are in turn mounted to the rear frame member 214. When the loader 200 is pointed in a straight direction (i.e., the front frame portion 212 is aligned with the rear frame portion 214) a portion of the cab is positioned over the rear frame portion 214.

The lift arm assembly 230 shown in FIGS. 2 and 3 is one example of many different types of lift arm assemblies that can be attached to a power machine such as loader 200 or other power machines on which embodiments of the present discussion can be practiced. The lift arm assembly 230 is a radial lift arm assembly, in that the lift arm is mounted to the frame 210 at one end of the lift arm assembly and pivots about the mounting joint 216 as it is raised and lowered. The lift arm assembly 230 is also a telescoping lift arm. The lift arm assembly includes a boom 232 that is pivotally mounted to the front frame member 212 at joint 216. A telescoping member 234 is slidably inserted into the boom 232 and a telescoping cylinder (not shown) is coupled to the boom, and the telescoping member and is operable to extend and retract the telescoping member under power. The telescoping member 234 is shown in FIGS. 2 and 3 in a fully retracted position. The implement interface 270 including implement carrier 272 and power couplers 274 are operably coupled to the telescoping member 234. An implement carrier mounting structure 276 is mounted to the telescoping member. The implement carrier 272 and the power couplers 274 are mounted to the positioning structure. A tilt cylinder 278 is pivotally mounted to both the implement carrier mounting structure 276 and the implement carrier 272 and is operable to rotate the implement carrier with respect to the implement carrier mounting structure under power. Among the operator controls 260 in the operator compartment 255 are operator controls to allow an operator to control the lift, telescoping, and tilt functions of the lift arm assembly 230.

Other lift arm assemblies can have different geometries and can be coupled to the frame of a loader in various ways to provide lift paths that differ from the radial path of lift arm assembly 230. For example, some lift paths on other loaders provide a radial lift path. Others have multiple lift arms coupled together to operate as a lift arm assembly. Still other lift arm assemblies do not have a telescoping member. Others have multiple segments. Unless specifically stated otherwise, none of the inventive concepts set forth in this discussion are limited by the type or number of lift arm assemblies that are coupled to a particular power machine.

Figure 4:
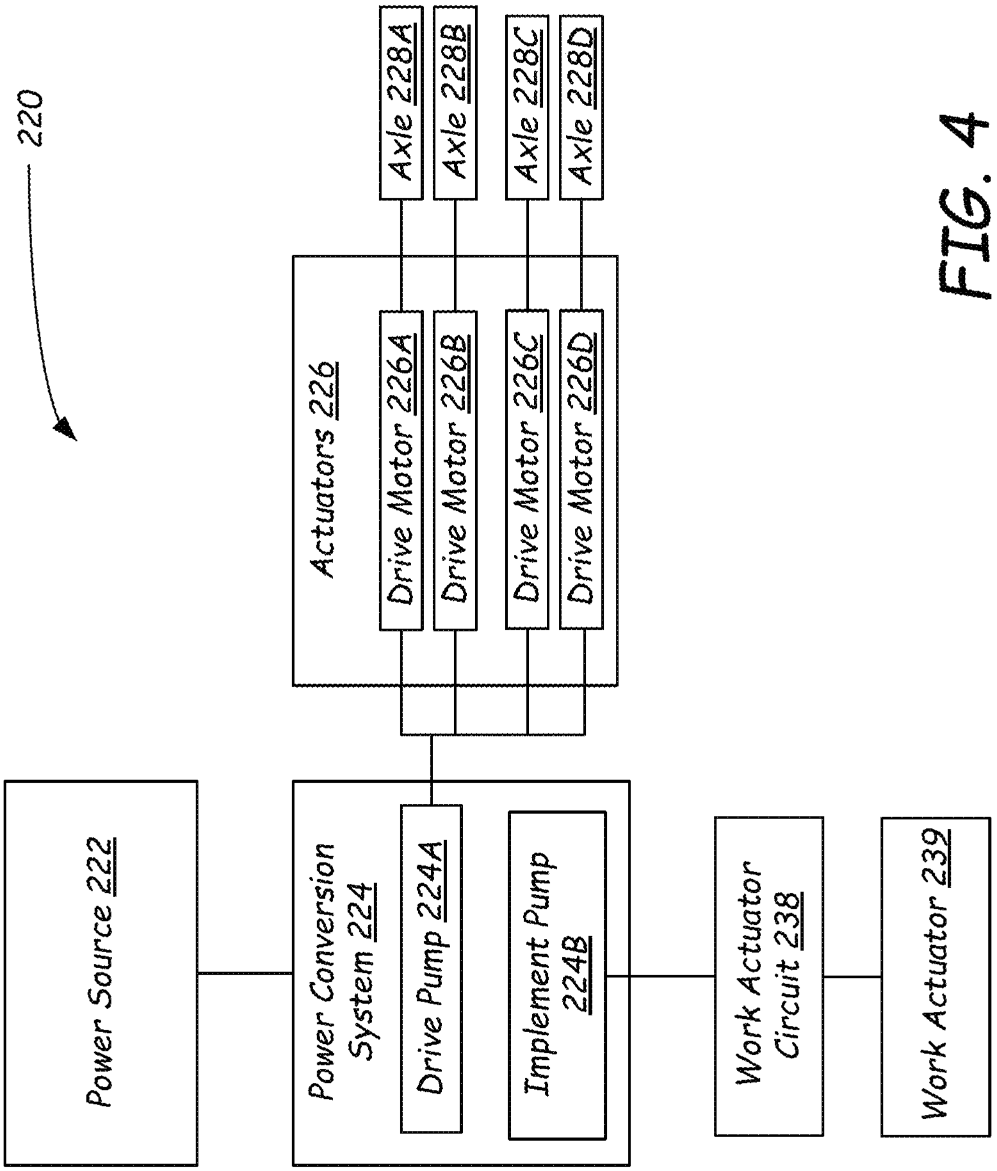
FIG. 4 is a block diagram illustrating components of a power system of a loader such as the loader of FIGS. 2 and 3.

FIG. 4 illustrates power system 220 in more detail. Broadly speaking, power system 220 includes one or more power sources 222 that can generate and/or store power for operating various machine functions. On loader 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a hydrostatic drive pump 224A, which provides a power signal to drive motors 226A, 226B, 226C and 226D. The four drive motors 226A, 226B, 226C and 226D in turn are each operably coupled to four axles, 228A, 228B, 228C and 228D, respectively. Although not shown, the four axles are coupled to the wheels 242A, 242B, 244A, and 244B, respectively. The hydrostatic drive pump 224A can be mechanically, hydraulically, and/or electrically coupled to operator input devices to receive actuation signals for controlling the drive pump. The power conversion system also includes an implement pump 224B, which is also driven by the power source 222. The implement pump 224B is configured to provide pressurized flow to a work actuator circuit 238. Work actuator circuit 238 is in communication with work actuator 239. Work actuator 239 is representative of a plurality of actuators, including the lift cylinder, tilt cylinder, telescoping cylinder, and the like. The work actuator circuit 238 can include valves and other devices to selectively provide pressurized hydraulic fluid to the various work actuators represented by block 239 in FIG. 4. In addition, the work actuator circuit 238 can be configured to provide pressurized hydraulic fluid to work actuators on an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
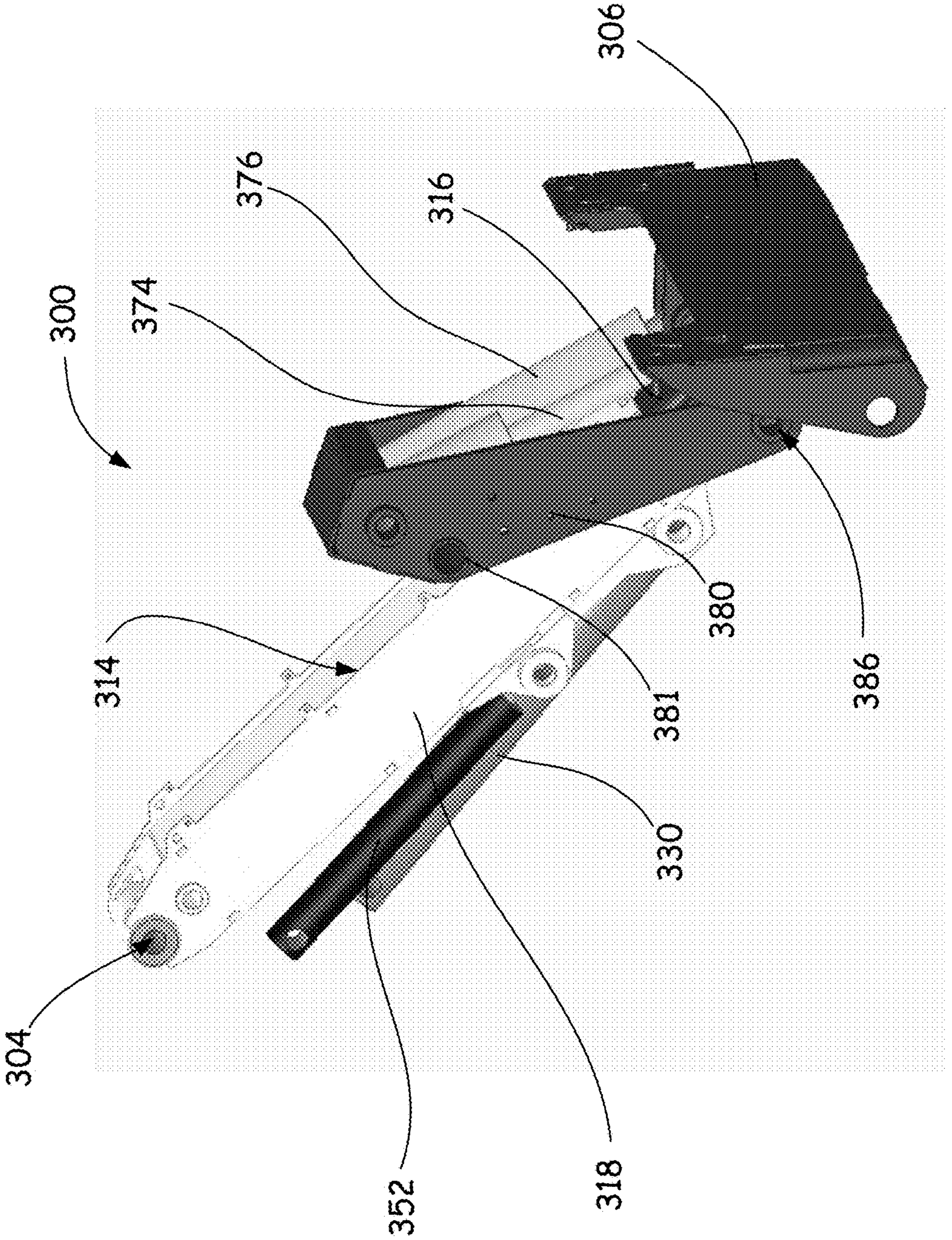
FIG. 5 is an isometric view of a lift arm assembly with a self-leveling system according to an embodiment of the present disclosure.

FIG. 5 shows a lift arm assembly 300 for a power machine (e.g., the loader 200) on which embodiments of the disclosure can be advantageously practiced. The lift arm assembly 300 includes a lift arm structure that is configured to be attached to a main frame of a power machine (e.g., the frame 210 of the loader 200, or a frame 324 as shown in FIG. 7) at a pivotal coupling 304, about which the lift arm assembly 300 can pivot relative to the frame. An implement carrier 306 is pivotally secured to the lift arm assembly 300 at a pivotal coupling 310 (see FIG. 6) and can support a bucket (not shown) or other implement for various work operations. In the illustrated embodiment, the lift arm assembly 300 includes a telescoping lift arm structure 314, with an extendable lift arm portion 316, that can be extended or retracted relative to a main lift arm portion 318 (e.g., under power of a linear actuator, such as, for example, an extension cylinder (not shown)), although other extendable and non-extendable lift arm structures are possible.

The lift arm assembly 300 also includes a hydraulic leveling system, to provide automatic leveling for a bucket or other implement that is attached to the implement carrier 306. In particular, and as further detailed below, a lift cylinder 330 is configured to extend and retract between the main lift arm portion 318 and the main frame of the power machine, and is configured for powered operation based on operator input to raise or extend and lower or retract the lift arm assembly 300. A follower cylinder 352 also extends between the main lift arm portion 318 and the main frame, so as to be directly mechanically synchronized with the lift cylinder 330, but is generally not configured for powered operation to raise or lower the lift arm assembly 300.

Continuing, a leveling link 380 is pivotally secured at a first end to the extendable lift arm portion 316, and pivotally secured at a second end to a leveling cylinder 374 and a tilt cylinder 376. Opposite the leveling link 380, the tilt cylinder 376 is pivotally secured to the implement carrier 306 and is configured for powered operation based on operator input to change an attitude of the implement carrier 306 relative to the extendable lift arm portion 316. In contrast, the leveling cylinder 374 is pivotally secured opposite the leveling link 380 to the extendable lift arm portion 316, so that extension or retraction of the leveling cylinder 374 can pivot the leveling link relative to the extendable lift arm portion 316 (and the main lift arm portion 318), and maintaining a fixed stroke position of the leveling cylinder 374 can maintain a fixed angular orientation of the leveling link 380 relative to the extendable lift arm portion 316 (e.g., so the leveling cylinder 374, the extendable lift arm portion 316, and the leveling link 380 can collectively define a fixed structure relative to which other components can pivot).

To provide for automatic leveling of the implement carrier 306, the leveling cylinder 374 is inversely hydraulically synchronized with the follower cylinder 352, so that an extension/retraction of the follower cylinder 352 causes a retraction/extension of the leveling cylinder 374. As noted above, the follower cylinder 352 is also mechanically synchronized with the lift cylinder 330. Thus, as the main lift arm portion 318 is raised (or lowered) under commanded operation of the lift cylinder 330, hydraulic flow between the follower cylinder 352 and the leveling cylinder 374 can cause the leveling cylinder 374 to retract (or extend). This movement of the leveling cylinder 374 can cause the leveling link 380 to pivot forward (or backward) relative to the extendable lift arm portion 316, which in turn can cause a corresponding forward (or backward) rotation of the implement carrier 306 (for any given fixed stroke position of the tilt cylinder 376). Accordingly, synchronized operation of the lift cylinder 330, the follower cylinder 352, and the leveling cylinder 374, in combination with the relative structural arrangement of the leveling link 380, the tilt cylinder 376, and the implement carrier 306, can at least partially counteract unwanted tilting of the implement carrier 306 due to raising or lowering of the lift arm assembly 300 as a whole.

Further in this regard, in the illustrated embodiment, the lift arm assembly 300 automatically controls tilt of the implement carrier 306 via two opposed bell crank arrangements that interoperate to allow active tilt control and passive tilt correction. A first bell crank arrangement is generally formed by the extendable lift arm portion 316, the leveling link 380, and the leveling cylinder 374. In particular, the extendable lift arm portion 316 provides a first (relatively) fixed pivot point for the leveling cylinder and a second (relatively) fixed pivot point for the leveling link 380. The leveling link 380 can thus be pivoted as a bell crank about the extendable lift arm portion 316 by extension or retraction of the leveling cylinder 374. A second bell crank arrangement is generally formed by the extendable lift arm portion 316, the leveling link 380, the leveling cylinder 374, the implement carrier 306, and the tilt cylinder 376. In particular, the extendable lift arm portion 316, the leveling link 380, and the leveling cylinder 374 (for a given stroke length of the leveling cylinder 374) collectively provide a first (relatively) fixed pivot point for the tilt cylinder 376 and a second (relatively) fixed pivot point for the implement carrier 306. At a different location than the leveling link 380, the implement carrier 306 can thus be pivoted as a bell crank about the extendable lift arm portion 316 by extension or retraction of the tilt cylinder 376, which the tilt cylinder 376 can be moved, in bulk, by pivoting of the first bell crank arrangement (i.e., by pivoting of the leveling link 380). Thus, more generally, a bell crank member that is pivotable within a reference frame of a first bell crank arrangement (e.g., the leveling link 380) can sometimes provide an attachment point for an actuator of a second bell crank arrangement (e.g., the tilt cylinder 376), while also sharing a common reference frame for pivoting movement (i.e., as provided by the rigid extendable lift arm portion 316) with a bell crank member of the second bell crank arrangement (e.g., the implement carrier 306).

Figure 5A:
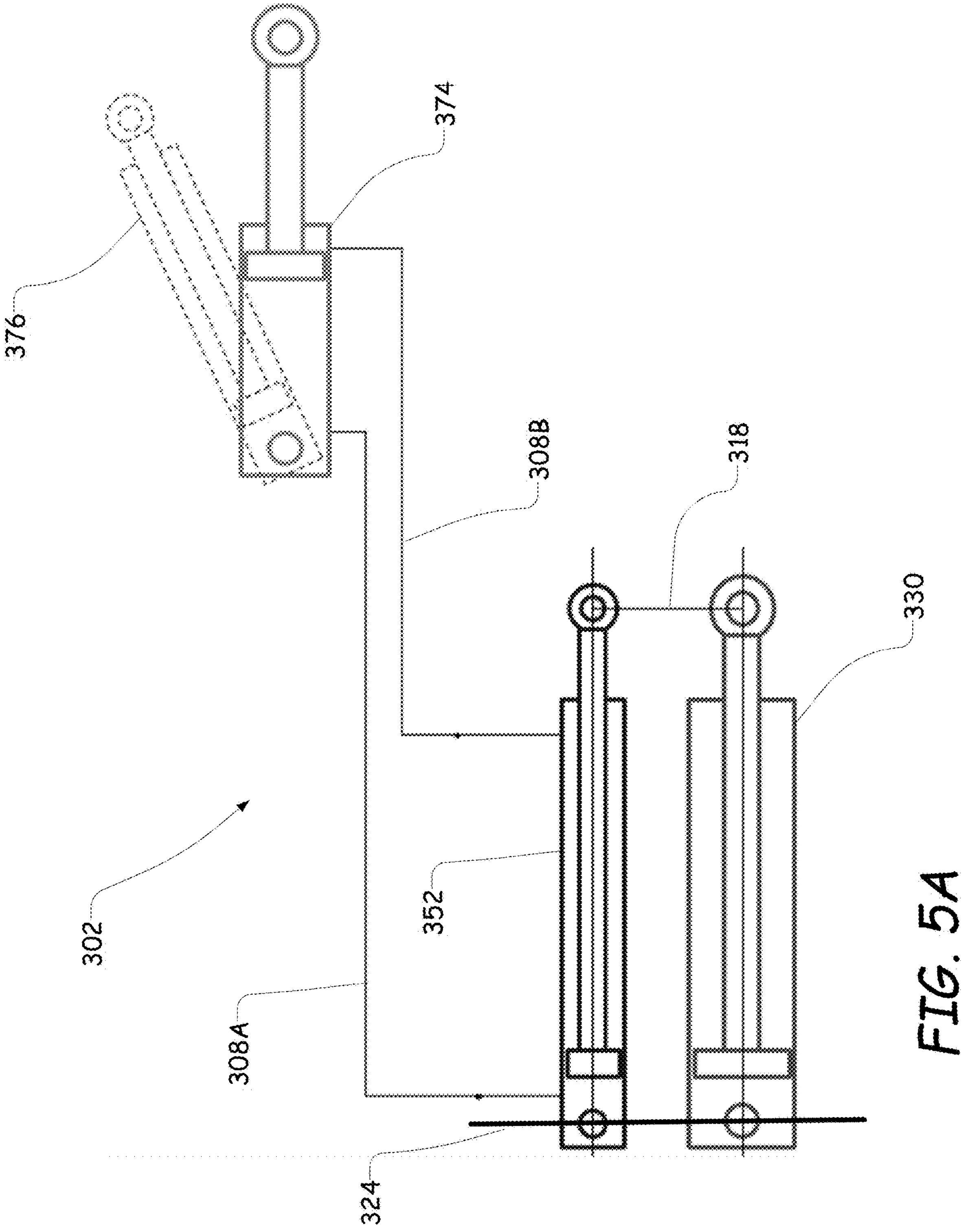
FIG. 5A is a schematic view of aspects of a lift arm assembly with a self-leveling system according to an embodiment of the present disclosure.

As also discussed above, a hydraulic leveling circuit can be configured to provide hydraulic synchronization for adjustments to the attitude of an implement. In this regard, FIG. 5A illustrates certain aspects of a hydraulic leveling circuit 302 for self-leveling systems, according to some examples of the disclosure. The leveling circuit 302 is discussed below and is illustrated as an example hydraulic circuit for use with lift arm assembly 300 of FIG. 5, but can also be used with a variety of other lift arm assemblies, including non-telescoping lift arm assemblies.

In the illustrated example, the hydraulic leveling circuit 302 is an isolated circuit with two non-powered cylinders (i.e., the follower and leveling cylinders 352, 374) that are hydraulically synchronized by the circuit 302 (i.e., inversely, in the illustrated configuration). In particular, a first hydraulic conduit 308A (e.g., a hose or tube) fluidly connects a first or base end of the follower cylinder 352 and a first or base end of the leveling cylinder 374, and a second hydraulic conduit 308B (e.g., a hose or a tube) fluidly connects a second or rod end of the follower cylinder 352 and a second or rod end of the leveling cylinder 374. Thus, the follower and leveling cylinders 352, 374 and the first and second conduits 308A, 308B form a closed, isolated hydraulic circuit, and extension (or retraction) of the follower cylinder 352 causes flow through the conduits 308A, 308B to drive retraction (or extension) of the leveling cylinder 374.

As illustrated in FIG. 5A, the hydraulic circuit 302 defines a closed volume, without inlets or outlets. In some examples, including as further discussed below, other hydraulic components can be included. For example, various combinations of pressure relief valves, check valves, or inlets from a charge pump (or other circuit component) can be included in some cases.

Also as illustrated in FIG. 5A, different cylinders in a leveling arrangement can exhibit different stroke length and displacement. Further, relative magnitudes of stroke length and displacement for different cylinders can be particularly selected in some cases to provide improved system response. For example, in the lift arm assembly 300 (see also FIG. 5), the lift cylinder 330 has a relatively large displacement, but is arranged structurally, in combination, with the smaller-displacement follower cylinder 352, so that the lift and follower cylinders 330, 352 have a similar stroke length. Thus, power from the lift cylinder 330 may be minimally drained by the follower cylinder 352, due to the need to move a relatively small amount of hydraulic fluid in and out of the follower cylinder 352 over a full stroke. Further, although displacements of the follower and leveling cylinders 352, 374 are the same, as corresponds to the constant-volume configuration of the circuit 302, the leveling cylinder 374 exhibits a shorter stroke length than the follower cylinder 352. In some cases, this arrangement may provide a particularly well-tuned response for a desired magnitude, range, or rate profile of tilt correction for a given movement of the lift cylinder 330 (and of the lift arm assembly 300 as a whole).

In the example of FIGS. 5 and 5A, and as further discussed below, a particular orientation of the base and rod ends of each of the lift, follower, leveling and tilt cylinders 330, 352, 374, 376 is provided, including relative to the direction in which a line of action from the base end to the rod end extends. In some cases, the illustrated configuration can provide particularly useful performance during filling, purging, and other operations. However, an orientation of one or more of the lift, follower, leveling, and tilt cylinders 330, 352, 374, 376 can be reversed in some examples.

In some examples, particularly beneficial tilt control can also be provided by particular arrangements of pivot axes, at which various cylinders or structural members are pivotally secured, as well as by other variations, including in cylinder properties (e.g., as discussed above), and structural lengths and angles (such as, e.g., lengths or angles of linkage). In this regard, for example, some examples can provide particularly favorable arrangements for operation with extendable lift arm assemblies.

Figure 6:
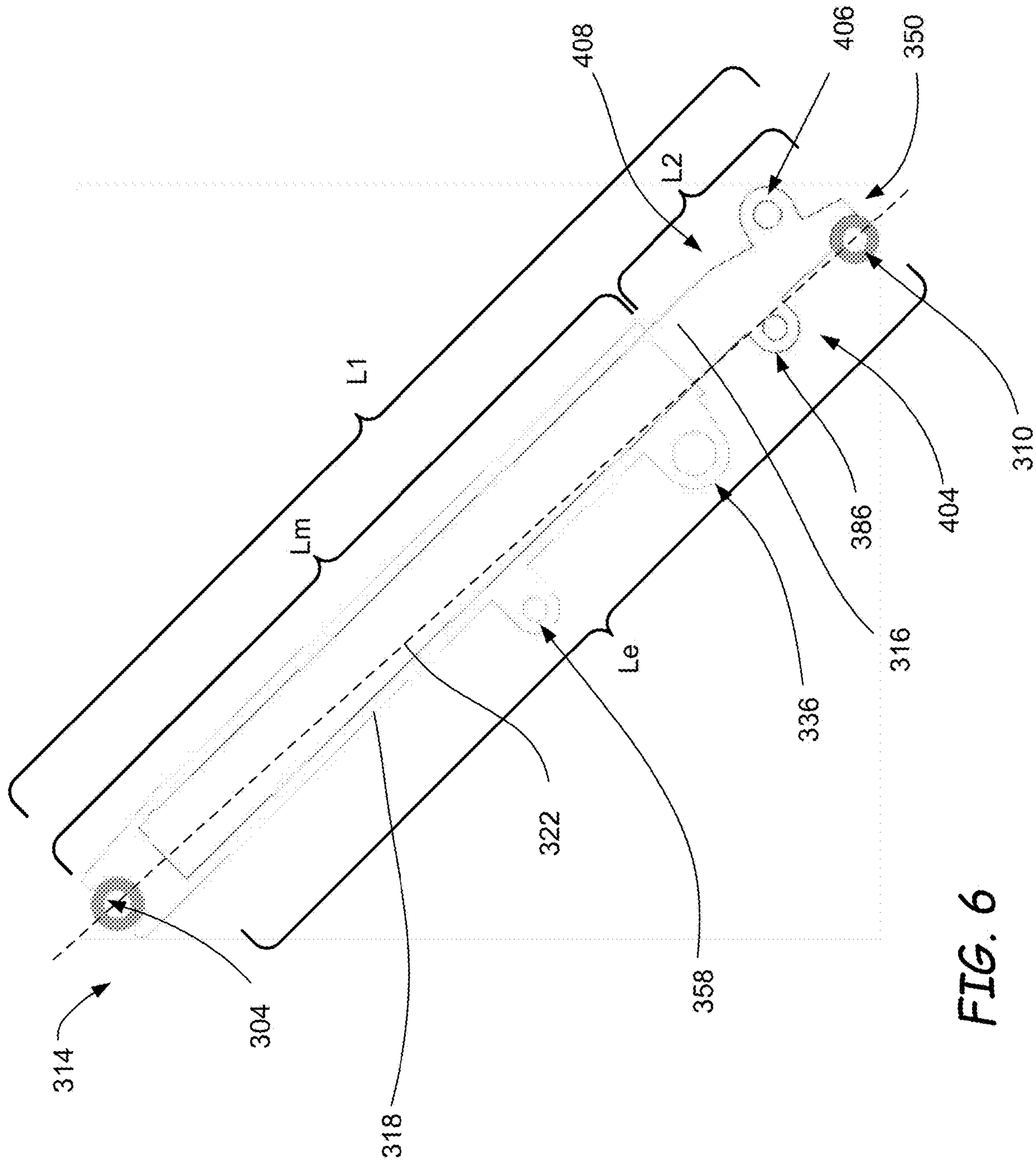
FIG. 6 is a schematic illustration of a lift arm structure for use in the lift arm assembly of FIG. 5.
Figure 7:
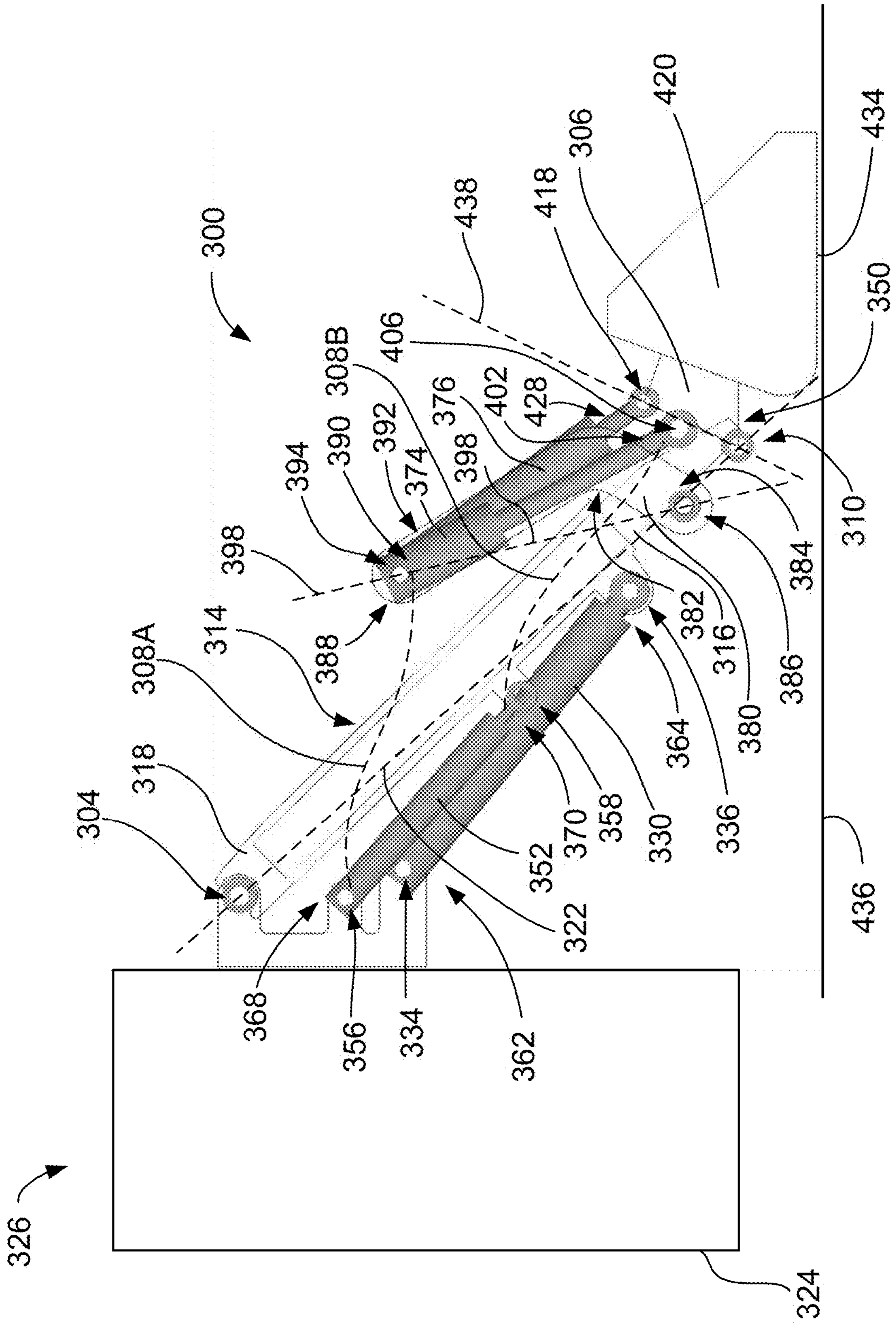
FIG. 7 is a schematic illustration of a power machine with the lift arm assembly of FIG. 5.

Turning to FIG. 6, for example, the lift arm structure 314 is illustrated in isolation. As mentioned above, the lift arm structure 314 includes the main lift arm portion 318 and the extendable lift arm portion 316, which is configured to extend or retract relative to the main lift arm portion 318. In a fully-retracted position, for example, as shown in FIG. 6, the lift arm structure 314 defines a retracted length L1, which is greater than a length Lm of the main lift arm portion 318. Further, in the present embodiment, the extendable lift arm portion 316 has a length Le that is dimensioned so that, in the fully retracted position, a portion of the extendable lift arm portion 316 extends beyond the main lift arm portion 318. The portion of the extendable lift arm portion 316 that extends beyond the main lift arm portion 318 has a length L2, which may be less than the length Lm in some examples. Furthermore, the lift arm structure 314 generally defines an elongate direction (e.g., also a line of action), which is illustrated in FIG. 6 as an axis 322 that extends through the first pivotal coupling 304 and the second pivotal coupling 310.

With this arrangement (or others, as applicable), it may be beneficial to locate pivot axes for particular cylinders toward the distal end of lift arm, with one or more particular relative orientations of a pivot axis for one or more of a leveling link, one or more of a leveling cylinder, or an implement carrier. Referring also to FIG. 7, the lift arm structure 314 is pivotally secured to the frame 324 of a power machine 326 at the pivotal coupling 304, e.g., by a pinned connection. The implement carrier 306 is coupled to the lift arm structure 314 at the pivotal coupling 310, at the distal end of the extendable lift arm portion 316. The lift cylinder 330 is pivotally secured to the frame 324 at a pivotal coupling 334 and to the lift arm structure 314 at a pivotal coupling 336. Thus, in response to operator commands, extension of the lift cylinder 330 can thus cause the lift arm structure 314 to pivot relative to the frame 324 about the coupling 304.

Continuing, the follower cylinder 352 is pivotally secured to the frame 324 at a pivotal coupling 356. In the embodiment illustrated, the pivotal couplings 334, 356 support both the lift cylinder 330 and the follower cylinder 352 for pivoting about different axes relative to the frame 324. Similarly, the pivotal couplings 336, 358 support both the lift cylinder 330 and the follower cylinder 352 for pivoting about different axes relative to the main lift arm portion 318. However, in some examples, a follower cylinder and a lift cylinder may be configured to pivot about a common pivot axis (e.g., by being secured with a common pivotal coupling).

As another benefit of the illustrated arrangement, the relative positioning of the pivotal couplings 334, 356 on the main frame 324 and of the pivotal couplings 336, 358 on the main lift arm portion 318 can beneficially provide a relatively short stroke for the follower cylinder 352 as compared to the lift cylinder 330. This configuration may provide for improved sizing for the leveling cylinder 374, among other benefits. However, in some embodiments, other spatial arrangements are possible.

In different examples, different orientations of pivot axes for ends of various cylinders can be particularly beneficial. Still referring to FIGS. 6 and 7, for example, the lift cylinder 330 and the follower cylinder 352 are each arranged to extend from the frame 324 to the lift arm structure 314 so that a base end 362 of the lift cylinder 330 is attached to the frame 324 at the coupling 334, and a rod end 364 of the lift cylinder 330 is attached to the lift arm structure 314 at the coupling 336. Similarly, in the illustrated embodiment, a base end 368 of the follower cylinder 352 is attached to the frame 324 at the coupling 356, and a rod end 370 of the follower cylinder 352 is attached to the lift arm structure 314 at the coupling 358. Further, to provide optimized tilt control via interoperation of the various cylinders and links, the pivotal coupling 356 at the main frame 324 is above and behind the pivotal coupling 334. Similarly, the pivotal coupling 358 at the lift arm structure 314 is above and behind the pivotal coupling 336 with the lift arm structure 314 fully-lowered, and is configured to remain behind the pivotal coupling 336 over an entire operational range of motion of the lift arm structure 314 (see, e.g., FIG. 11). (An operational range indicates a range of movement between a fully lowered and fully raised orientation for a given lift arm structure under rated operating conditions, as may generally correspond to fully extended and fully retracted position of a lift cylinder or to mechanical stops on a main frame that prevent further movement of a lift arm structure in a particular direction.)

However, other configurations are possible. For example, as generally noted above, a rod end of a lift actuator can be attached to a frame, and a base end of the lift actuator can be attached to a lift arm. For example, in some examples, a follower actuator can be arranged so that its rod end is attached to a frame, and its base end is attached to a lift arm. Also in the illustrated arrangement, the lift cylinder 330 and the follower cylinder 352 are substantially geometrically parallel (i.e., parallel to within ±5 degrees), with the lift arm structure 314 fully lowered and may remain substantially geometrically parallel over a full range of motion of the lift arm structure 314 (see, e.g., FIG. 11). However, the lift and follower cylinders 330, 352 may be angled differently relative to each other in other arrangements. Further, the angle defined between the lift cylinder 330 and the follower cylinder 352 may change in various ways as the lift cylinder 330 is actuated.

A first end 384 of the leveling link 380 is pivotally secured to the extendable lift arm portion 316 of the lift arm structure 314 at a first pivotal link coupling 386 and provided to operatively couple ends of the leveling cylinder 374 and the tilt cylinder 376 to the extendable lift arm portion 316. Particularly, a second end 388 of the leveling link 380 is pivotally secured to a first end 390 of the leveling cylinder 374 and to a first end 392 of the tilt cylinder 376, at a pivotal coupling 394, opposite the second end 428. Accordingly, the leveling link 380 defines a leveling link axis 398, which extends through the first link coupling 386 and the second link coupling 394.

As also generally noted above, although the first ends 390, 392 are base ends of the leveling and tilt cylinders 374, 376, other configurations are possible. For example, in some examples, rod ends of a leveling cylinder and/or a tilt cylinder may be pivotally secured to a leveling link. Further, although a common pivot axis for the leveling and tilt cylinders 374, 376 at the leveling link 380 can provide a beneficial balance between the typically opposed forces applied by the leveling and tilt cylinders 374, 376 other configurations are also possible.

In this regard, some examples can include a torque tube or other similar structural member for a leveling link, including as can help to counteract torsional moments that are caused by offsets between the leveling and tilt cylinders 374, 376, respectively. For example, in the illustrated example, although the leveling and tilt cylinders 374, 376 are pivotally secured to the leveling link 380 along a common axis, the leveling and tilt cylinders 374, 376 are laterally offset relative to each other (i.e., in a direction extending into the page of FIG. 7) and thus can create a torsional moment on the leveling link 380 during operation. Correspondingly, a torque tube 381 (see FIG. 5) extends between the opposed side plates that form the leveling link 380, in relatively close proximity to the pivoting axis of the leveling and tilt cylinders 374, 376 (e.g., behind and below the leveling and tilt cylinders 374, 376 but above the main and extendable lift arm portions 318, 316). Thus, despite the torsional moment that can result from loading of the leveling and tilt cylinders 374, 376, the torque tube 381 can prevent the side plates of the leveling link 380 from rotating independently of each other.

As noted above, it may be beneficial to locate a torque tube behind and below a pivot axis for leveling and link cylinders on a leveling link, with the torque tube above main/extendable lift arm portions. However, other useful configurations are also possible. In some examples, a torque tube can be disposed along a line of action of a leveling link or relevant cylinder. In some examples, a torque tube can be located opposite a leveling or tilt cylinder from a lift arm (e.g., above the leveling and tilt cylinders 374, 376 in FIG. 7, but with a different shaped leveling link in place of leveling link 380). In some examples, a torque tube can be coaxial with a pivot axis for a leveling link and a relevant (e.g., tilt or leveling) cylinder. Further, although a circular, closed torque tube 381 is shown in FIG. 7, a variety of other shapes can be used, including other round, rectangular (e.g., square), open, or closed profiles.

Still referring to FIGS. 6 and 7, the leveling cylinder 374 extends from the second end 388 of the leveling link 380 to the extendable lift arm portion 316, with a second end 402 of the leveling cylinder 374 pivotally secured to the extendable lift arm portion 316 at a pivotal coupling 406. In some examples, unexpected balances between kinematic considerations can provide particularly beneficial overall performance of a self-leveling assembly. For example, in the illustrated embodiment, the first end 384 of the leveling link 380 is coupled to the extendable lift arm portion 316 on a first or lower side 404 of the extendable lift arm portion 316 at the first link coupling 386, whereas the second end 402 of the leveling cylinder 374 is pivotally secured to the extendable lift arm portion 316 at the coupling 406, which is disposed on a second or upper side 408 of the extendable lift arm portion 316 that generally opposes the lower side 404. In some cases, although kinematic considerations may suggest a higher orientation for the coupling 386 and a lower orientation for the coupling 406, the illustrated arrangement may provide a particularly useful balance of forces and coordination of relative movement of (and spacing between components of) the lift arm assembly 300, including the implement carrier 306 and an attached implement 420.

Referring in particular to FIG. 6, similar benefits can also be obtained from the illustrated placement of the pivotal couplings 350, 386, 406 along the length L2 of the extendable lift arm portion 316, with the pivotal couplings 386, 406 for the leveling link 380 (see FIG. 5) and the leveling cylinder 374 (see FIG. 5) between the pivotal coupling 310 for the implement carrier 306 (see FIG. 5) and the main lift arm portion 318. However, other configurations are possible. For example, in some examples, a leveling link and a level actuator may be coupled to a lift arm structure on a common side of a lift arm structure, or with other locations relative to each other or other lift arm features.

Referring again to FIG. 7, as also discussed above, the leveling cylinder 374 is hydraulically synchronized with the follower cylinder 352, via the first and second hydraulic conduits 308A, 308B, so that extension/retraction of the follower cylinder 352 results in retraction/extension of the leveling cylinder 374. Further, due to the mechanically synchronized configuration of the lift cylinder 330 and the follower cylinder 352, extension/retraction of the lift cylinder 330 can cause, via movement of the follower cylinder 352, retraction/extension of the leveling cylinder 374. Thus, extension of the lift cylinder 330 to raise the lift arm structure 314 can cause the leveling link 380, via the resulting retraction of the leveling cylinder 374 (e.g., a rod end 386), to pivot clockwise. Further, at any given stroke position, the tilt cylinder 376 serves as a structural link between the leveling link 380 and the implement carrier 306, because the tilt cylinder 376 is pivotally secured to the leveling link 380 at the coupling 394 and to the implement carrier 306 at pivotal coupling 418. Accordingly, clockwise rotation (i.e., as illustrated, forward rotation) of the leveling link 380 as the lift arm structure 314 is raised can cause the implement carrier 306 to also pivot clockwise, via bulk movement of the tilt cylinder 376 by the leveling link 380. Likewise, retraction of the lift cylinder 330 to lower the lift arm structure 314 can cause the implement carrier 306 to pivot counterclockwise, via bulk movement of the tilt cylinder 376 by the leveling link 380. Further, for any given orientation of the leveling link 380 and the implement carrier 306 can still be actively tilted in either direction by an operator-commanded extension or retraction of the tilt cylinder 376.

Although the illustrated pivoting arrangements may be beneficial in some cases, some examples can include other known types of cylinder mounting arrangements. For example, tilt (or other) cylinders in some examples may be trunnion mounted using any variety of known trunnion configurations, as may provide packaging (or other) benefits. In some cases, trunnion-mounted arrangements can reduce a dead length for a tilt (or other) cylinder, including to negative values.

Figure 8:
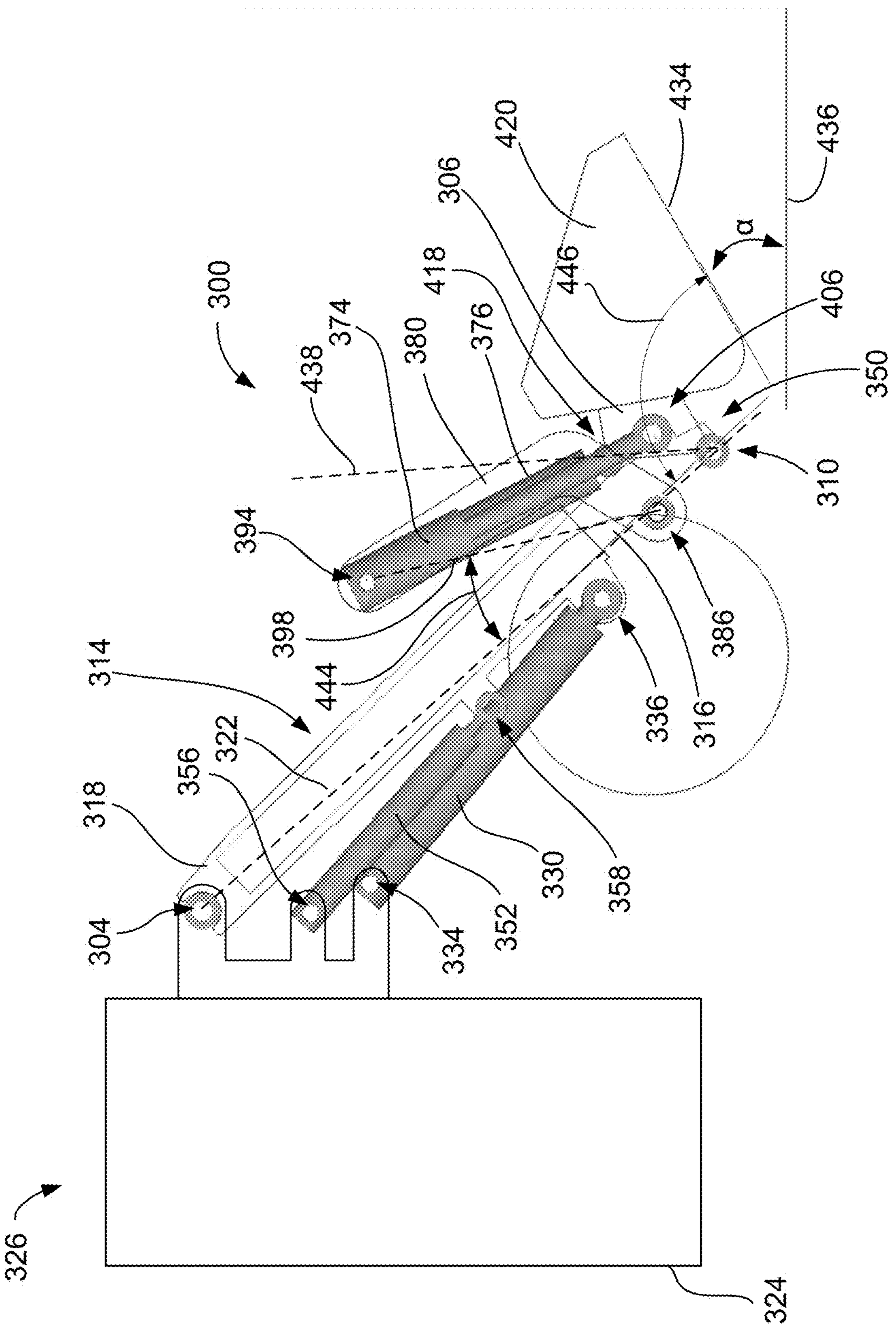
FIG. 8 is a schematic illustration of the power machine and the lift arm assembly of FIG. 5, in a lowered, full rollback position.
Figure 9:
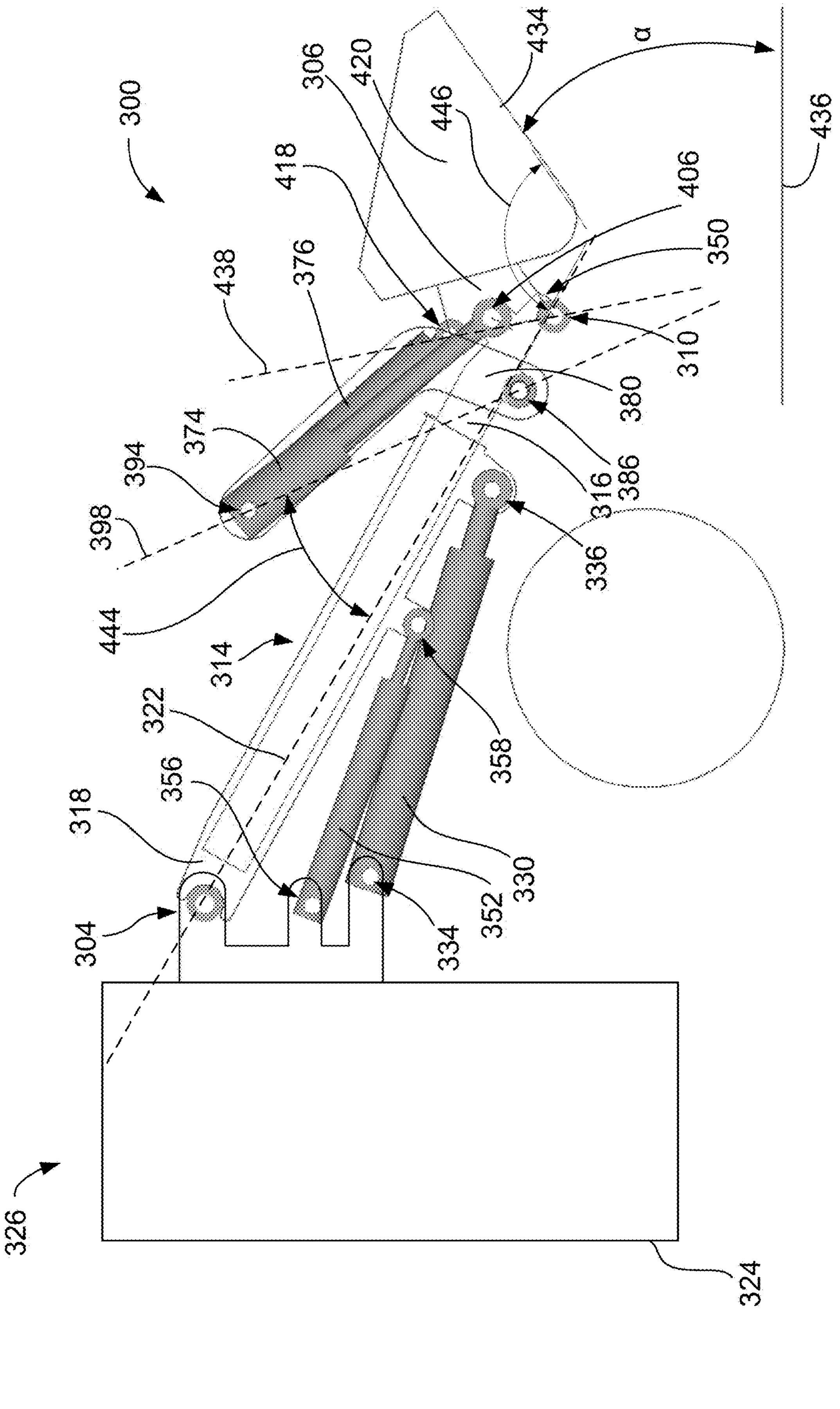
FIG. 9 is a schematic illustration of the power machine and the lift arm assembly of FIG. 5, in a raised, full rollback position.

In some examples, the particular arrangement of pivot axes and linkages illustrated in FIGS. 5-7 can provide substantially improved leveling as compared to conventional approaches. In this regard, for example, FIGS. 8 and 9 illustrate the lift arm assembly 300 at different stages along a lift travel path (i.e., at different positions as the lift cylinder 330 is actuated). For example, FIG. 8 illustrates the lift arm assembly 300 in a lowered position, with the implement 420 in a full rollback position, so that a reference wall 434 of the implement 420 (e.g., a blade wall of a bucket, as shown) forms an angle α with a reference surface 436 (e.g., a cutting edge angle relative to ground, as shown). FIG. 9 illustrates the lift arm assembly 300 in a partially raised position, as compared to the position of FIG. 8, with the implement 420 in the full rollback position. Due to automatic leveling provided by the lift arm assembly 300, as also detailed above, the implement carrier 306 maintains a similar alignment relative to the frame 324 and to the ground surface 436 during travel between the positions of FIG. 8 and FIG. 9. For example, in some examples, the angle α may change by only about 30 degrees as the lift arm assembly 300 moves while the tilt cylinder 376 remains fully retracted. In the illustrated embodiment, the relative configuration of pivot axes and structural lengths may beneficially provide reduced change in the angle α over a lift range that is closer to a fully lowered configuration, as compared to over a lift range that is closer to a fully raised configuration. However, in other examples, other rates of change in a relevant angle during lifting operations can be provided.

Figure 10:
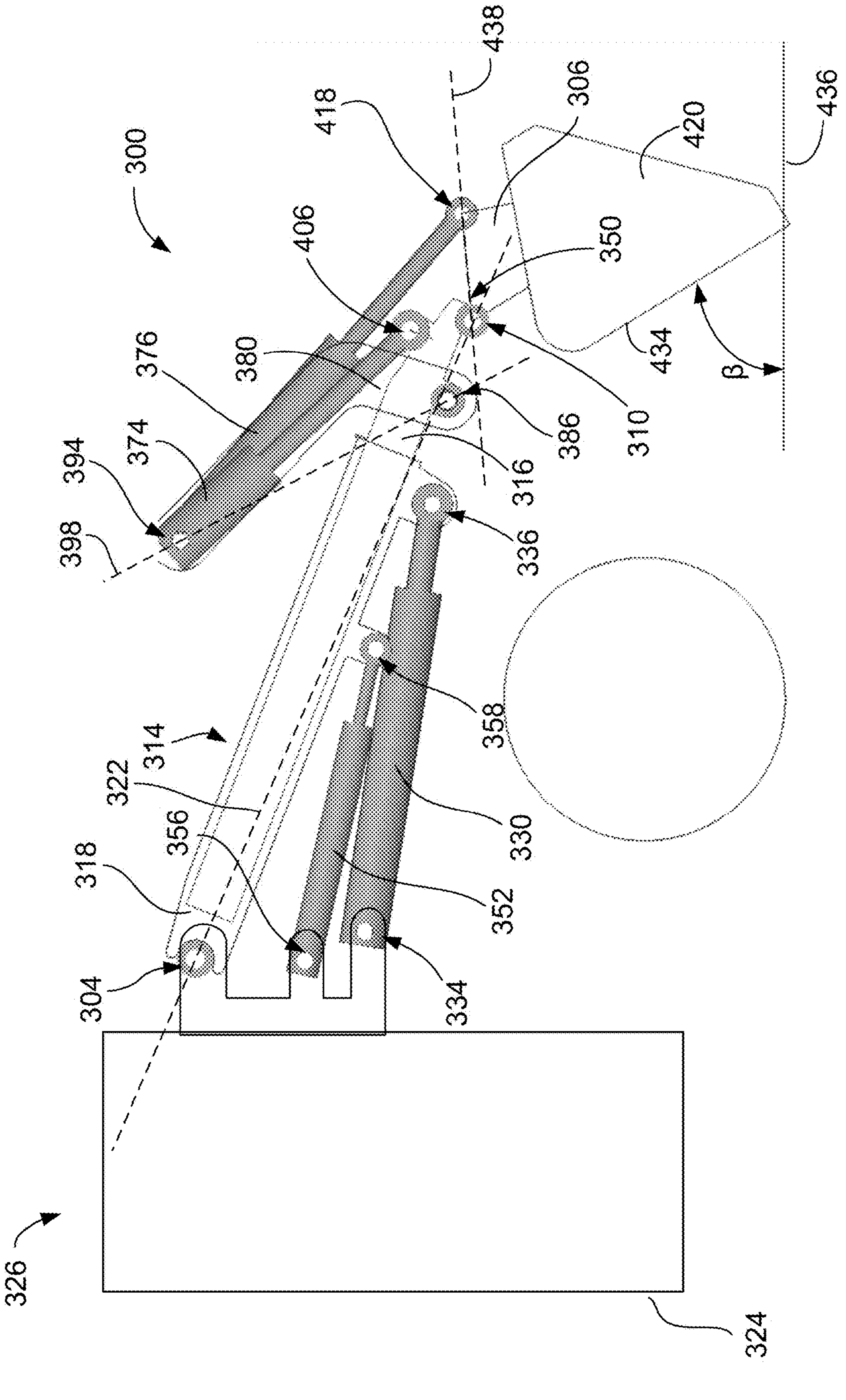
FIG. 10 is a schematic illustration of the power machine and the lift arm assembly of FIG. 5, in a partially lowered, fully rolled out position.
Figure 11:
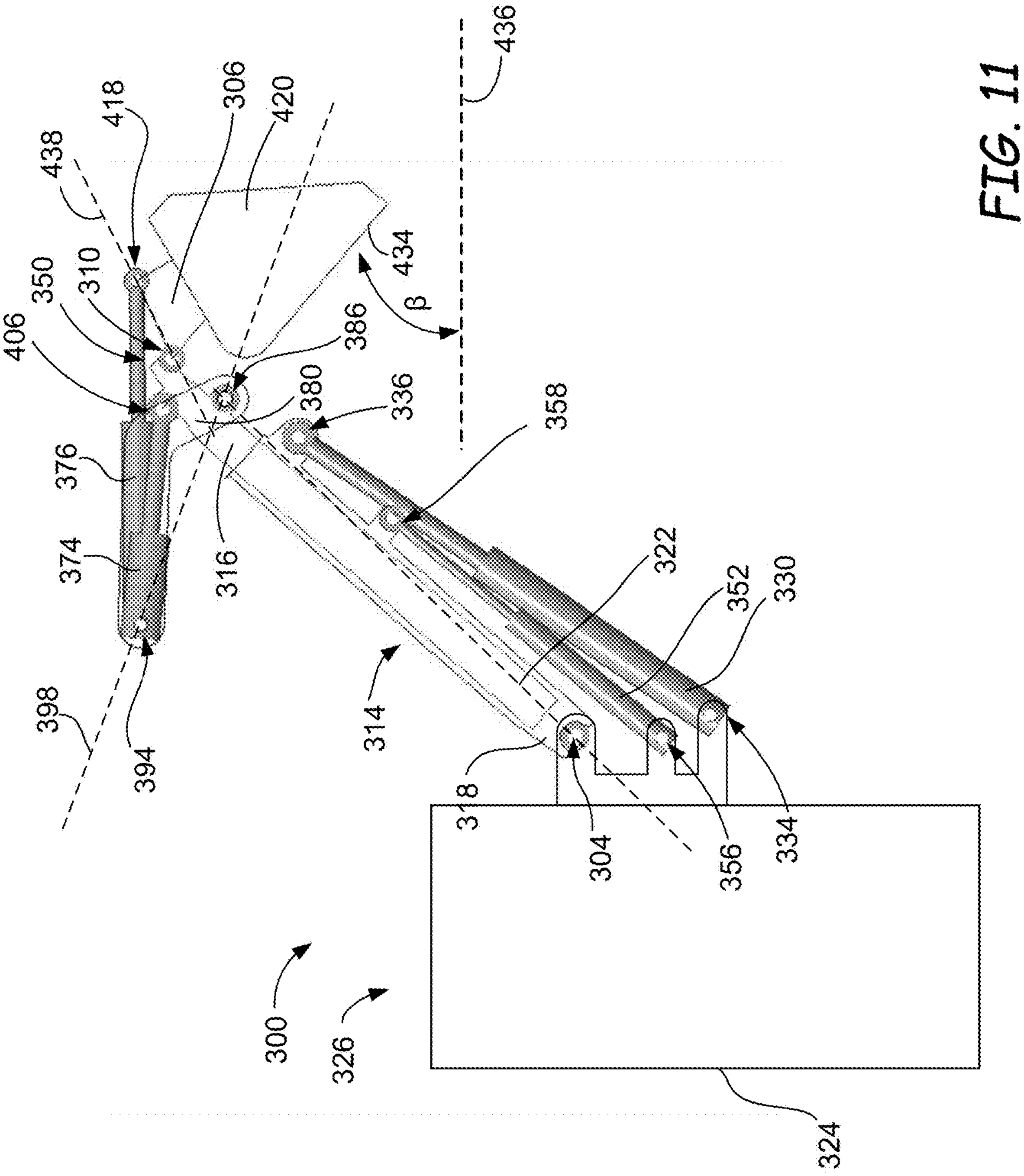
FIG. 11 is a schematic illustration of the power machine and the lift arm assembly of FIG. 5, in a raised, fully rolled out position.

FIGS. 10 and 11 illustrate the lift arm assembly 300 at different stages along a lift path (e.g., a radial lift path, as shown), with the implement carrier 306 supporting the implement 420 in a back-dragging orientation. In particular, FIG. 10 illustrates the lift arm assembly 300 in a partially lowered position with the tilt cylinder 376 in a fully extended position. Thus, the implement carrier 306 has been pivoted clockwise so that the reference wall 434 of the implement 420 forms an angle with the reference surface 436. FIG. 11 illustrates the lift arm assembly 300 in a raised position, as compared to the position of FIG. 10. Again, due to automatic leveling provided by the lift arm assembly 300, as also detailed above, the implement carrier 306 maintains a substantially steady alignment relative to the frame 324 and to the ground surface 436 during travel along the lift path between the positions of FIG. 10 and FIG. 11.

In some examples, beneficial leveling control may be provided if a leveling link generally angles away from a distal end of a lift arm. Still referring to FIGS. 7-11, for example, the leveling link 380 can be configured as an elongate member that angles generally rearwardly along a line of action that extends between opposite pivotally secured ends thereof, although other configurations are possible (such as, e.g., configurations with J-shaped or other bends (not shown)). Generally, however, an elongate direction can be defined for a leveling link between opposing pivotal couplings for the link (such as, e.g., at a lift arm and at one or more of a leveling cylinder or a tilt cylinder), and the elongate direction can generally be configured to extend, from a coupling at a lift arm, away from an associated implement carrier. In this regard, as also noted above, the leveling link 380 defines the link axis 398, which extends through the couplings 310, 418, and generally obliquely relative to a tilt offset axis 438 that extends between couplings 310, 406. Further, as generally shown in FIGS. 7-11, although the link axis 398 pivots generally toward the implement carrier 306 during a lifting operation, an acute angle relative to the lift arm axis 322 is maintained over a full range of movement for the lift arm assembly 300. (In contrast, for example, the axis 438 may sometimes extend at acute angle relative to the lift arm axis 322, including as shown in FIGS. 7-9 and may sometimes extend at an oblique angle relative to the lift arm axis 322, including as shown in FIGS. 10 and 11.) Along with improved tilt control and force distribution, this angularly constrained operation of the leveling link 380 can provide improved visibility for operators over a range of lift arm movements.

From another perspective, certain arrangements of a hydraulic leveling system can provide other beneficial movements. For example, as shown in FIGS. 8 and 9 in particular, the leveling link axis 398 forms a first angle 444 with the lift arm axis 322, and the reference wall 434 (e.g., the cutting edge) of the implement 420 forms a second angle 446 with the lift arm axis 322. In some cases, including as illustrated, the first angle 446 may increase during one or more lift arm operations (e.g., as generally illustrated in FIGS. 8-11) but may remain in a range that is between about one-third or a half of the second angle 446.

As generally discussed above, during operation of a leveling cylinder and a follower cylinder, hydraulic communication may be maintained between respective corresponding ends of the leveling and following cylinders in order to effect appropriately synchronized extension/retraction and to help maintain synchronization between the leveling and following cylinders when the leveling and following cylinders are not being extended or retracted. Accordingly, hydraulic circuits for leveling cylinders and follower cylinders can include hydraulic flow lines that connect the leveling and following cylinders together for hydraulically synchronized movement (see, e.g., lines 308A, 308B in FIG. 7). However, certain operating conditions, including uneven loading on the leveling and following cylinders, can sometimes result in loss of synchronization (e.g., with one cylinder reaching end of stroke before the other cylinder). Thus, discussed in greater detail below, some examples of the disclosure can include appropriately configured flow-control devices (such as, e.g., pressure relief or check valves), to selectively release (or add) fluid from (or to) the hydraulic circuit, and thereby allow proper synchronization and other operations of the leveling and following cylinders.

Figure 12:
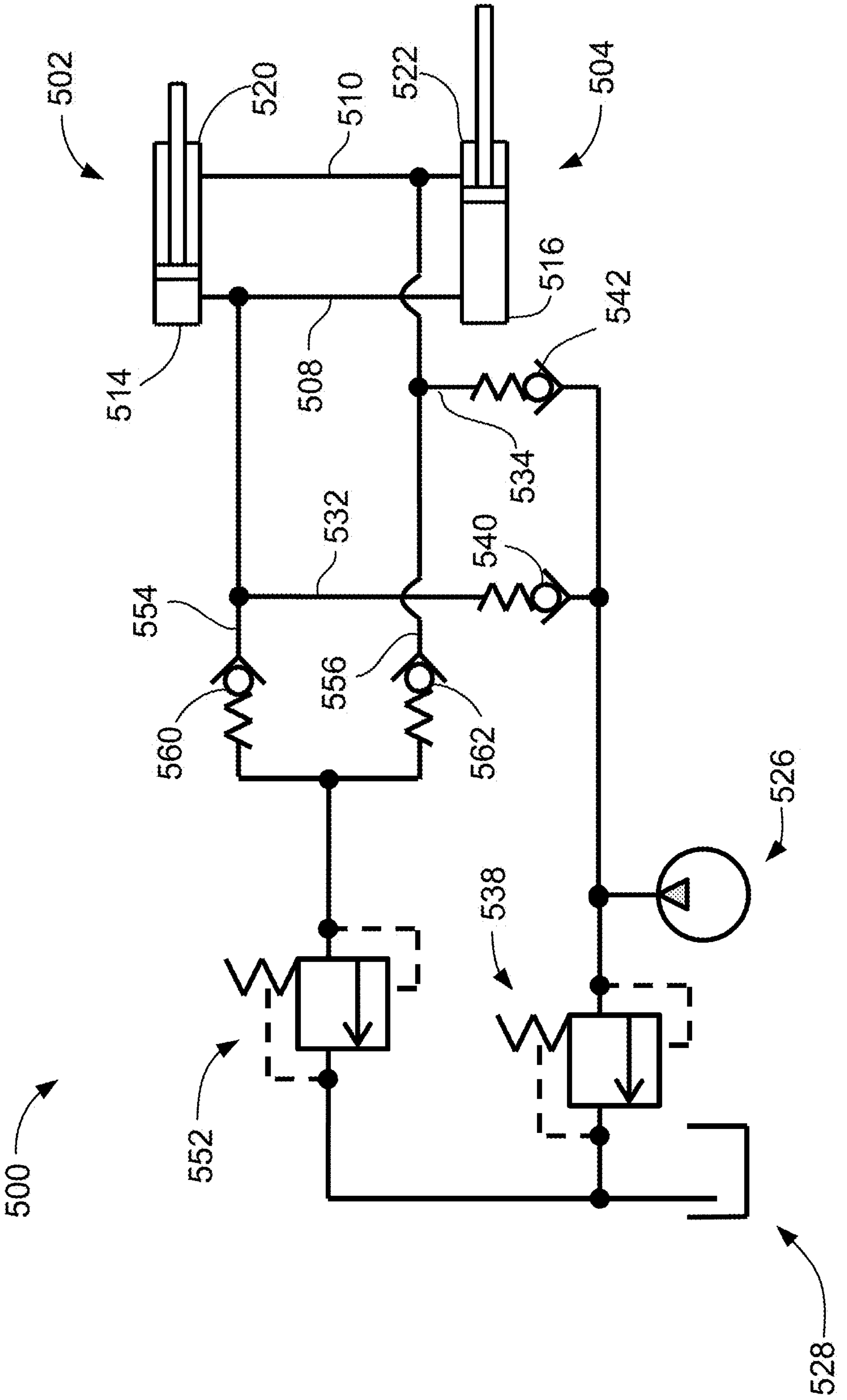
FIGS. 12-14 are diagrammatic illustrations of hydraulic circuits for a lift arm assembly according to examples of the present disclosure.

FIG. 12 shows an example hydraulic circuit 500 according to some examples of the disclosure, as can be implemented on power machines such as the type illustrated in FIG. 1, including articulated loaders such as the type illustrated in FIG. 2. The circuit 500 is one particular example of part of a work actuator circuit of the type illustrated in FIG. 4 and is a particular variation of the isolated hydraulic leveling circuit 302 of FIG. 5A. The hydraulic circuit 500 can provide appropriate control of hydraulic flow for self-leveling systems, including systems similar to those illustrated in FIGS. 5-11 and others. Correspondingly, in some cases, the hydraulic circuit 500 can be used with the lift arm assembly 300 as illustrated in FIGS. 5-11 or other relevant lift arm assemblies.

In the hydraulic circuit 500, a follower cylinder 502 and a leveling cylinder 504 are hydraulically connected by a first flow line 508 and a second flow line 510. More specifically, the first flow line 508 directly connects a first or base end 514 of the follower cylinder 502 to a first or base end 516 of the leveling cylinder 504, and the second flow line 510 directly connects a second or rod end 520 of the follower cylinder 502 to a second or rod end 522 of the leveling cylinder 504, without intervening (e.g., powered) equipment. Thus, the first flow line 508 and the second flow line 510 can allow fluid to flow between the follower cylinder 502 and the leveling cylinder 504 as the cylinders 502, 504 extend or retract.

Generally, some hydraulic circuits according to this disclosure can include features that can help to remedy unwanted desynchronization of cylinders. For example, in the illustrated embodiment, the hydraulic circuit 500 is in communication with a charge pump 526, which can provide pressurized hydraulic fluid from a tank 528 to the base ends 514, 516 and the rod ends 520, 522 of the follower and leveling cylinders 502, 504 (such as, e.g., via a third flow line 532 and a fourth flow line 534, respectively). Further, the hydraulic circuit 500 includes a charge relief valve 538 proximate the charge pump 526 that can determine a delivery pressure of charge fluid from the charge pump 526 to the hydraulic circuit 500, and a purge relief valve 552 that can set a particular maximum pressure for the circuit 500. Generally, the charge and purge relief valves 538, 552 can be configured as any variety of known types of pressure relief valves or valve assemblies. As also noted above, other flow sources (e.g., accumulators) can sometimes be used in place of (or in cooperation with) a charge pump, to provide flow into one or more hydraulic leveling circuits according to the disclosure.

Continuing, the third flow line 532 further includes a first base check valve 540, which is configured such that flow from the charge pump 526 at sufficient pressure can flow through the first base check valve 540 into the hydraulic circuit 500, whereas flow in the reverse direction (i.e., from the base ends 514, 516 out of the hydraulic circuit 500 at the check valve 540) is generally prevented. Similarly, the fourth line 534 further includes a first rod check valve 542, which is configured such that flow from the charge pump 526 at sufficient pressure can flow through the first rod check valve 542 into the hydraulic circuit 500, whereas flow in the reverse direction is generally prevented.

Thus, makeup fluid for the hydraulic circuit 500 can be provided by the charge pump 526 (such as, e.g., to help remedy a loss of synchronization between the follower and leveling cylinders 502, 504) without the charge pump 526 causing either of the follower and leveling cylinders 502, 504 to extend or retract. Further, when pressure at the follower and leveling cylinders 502, 504 exceeds a pressure limit, hydraulic fluid can be released via the purge relief valve 552. Correspondingly, for example, if certain operations result in desynchronization of the movement of the follower and leveling cylinders 502, 504, simply extending or retracting follower cylinder 502 to the end of stroke by raising or lowering the lift arm can re-synchronize the leveling cylinder 504 with the follower cylinder 502 for continued operation. For example, as the one lagging cylinder of the follower and leveling cylinders 502, 504 is moved toward its end of stroke, any excess hydraulic fluid on the rod end 520, 522 (or the base end 514, 516) of the cylinders 502, 504 can be released to the tank 528 by the purge relief valve 552, via a fifth flow line 554 (or a sixth flow line 556) and a second base check valve 560 (or second rod check valve 562). Further, the charge pump 526 can simultaneously supply any needed makeup hydraulic fluid to the base end 514, 516 (or the rod end 520, 522) of the cylinders 502, 504 via the third flow line 532 (or the fourth flow line 534). Accordingly, moving both cylinders 502, 504 to end of stroke can efficiently re-synchronize the cylinders 502, 504, as needed, for continued synchronized operation thereafter. During this and other operations, the purge relief valve 552 can also release air that may be trapped in the circuit 500, as needed.

Figure 13:
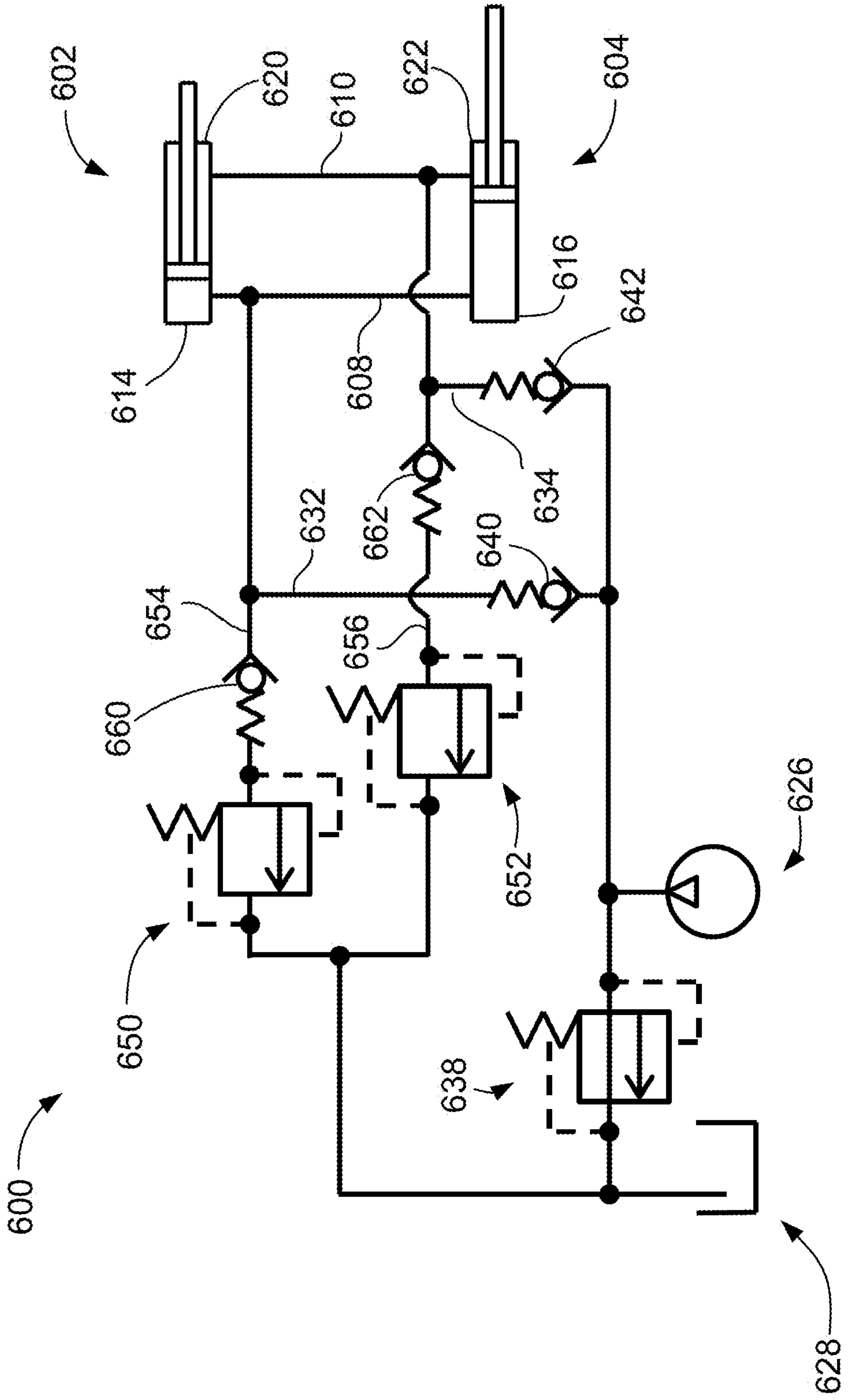

FIG. 13 shows an example hydraulic circuit 600 according to some examples of the disclosure, as can be implemented on power machines such as the type illustrated in FIG. 1, including articulated loaders such as the type illustrated in FIG. 2. The circuit 600 is one particular example of part of a work actuator circuit of the type illustrated in FIG. 4 and is a particular variation of the isolated hydraulic leveling circuit 302 of FIG. 5A. The hydraulic circuit 600 can provide appropriate control of hydraulic flow for self-leveling systems, including systems similar to those illustrated in FIGS. 5-11 and others. Correspondingly, in some cases, the hydraulic circuit 600 can be used with the lift arm assembly 300 as illustrated in FIGS. 5-11 or other relevant lift arm assemblies.

The hydraulic circuit 600 is generally similar to the hydraulic circuit 500, with components that have similar configurations and purposes being numbered similarly to FIG. 12, but in the "600*s*." Thus, for example, the hydraulic circuit 600 includes a follower cylinder 602, a leveling cylinder 604, check valves 640, 642, etc. and can generally operate similarly to the hydraulic circuit 500 to manage pressure at the follower and leveling cylinders 602, 604 and correct desynchronized operation of the follower and leveling cylinders 602, 604. Similarly, the hydraulic circuit 600 also includes first flow line 608, second flow line 610, charge pump 626, tank 628, third flow line 632, fourth flow line 634, charge relief valve 638, fifth flow line 654, sixth flow line 656, second base check valve 660, and second rod check valve 662. In some aspects, however, the hydraulic circuit 600 differs from the hydraulic circuit 500. For example, instead of the single purge relief valve 552 of the hydraulic circuit 500 of FIG. 12, the hydraulic circuit 600 includes a base purge relief valve 650 that separately sets a maximum pressure for base ends 614, 616 of the follower and leveling cylinders 602, 604, and a rod purge relief valve 652 that sets a maximum pressure for rod ends 620, 622 of the follower and leveling cylinders 602, 604. This may be useful, for example, to better accommodate differently sized cylinders, as well as other variations.

Figure 14:
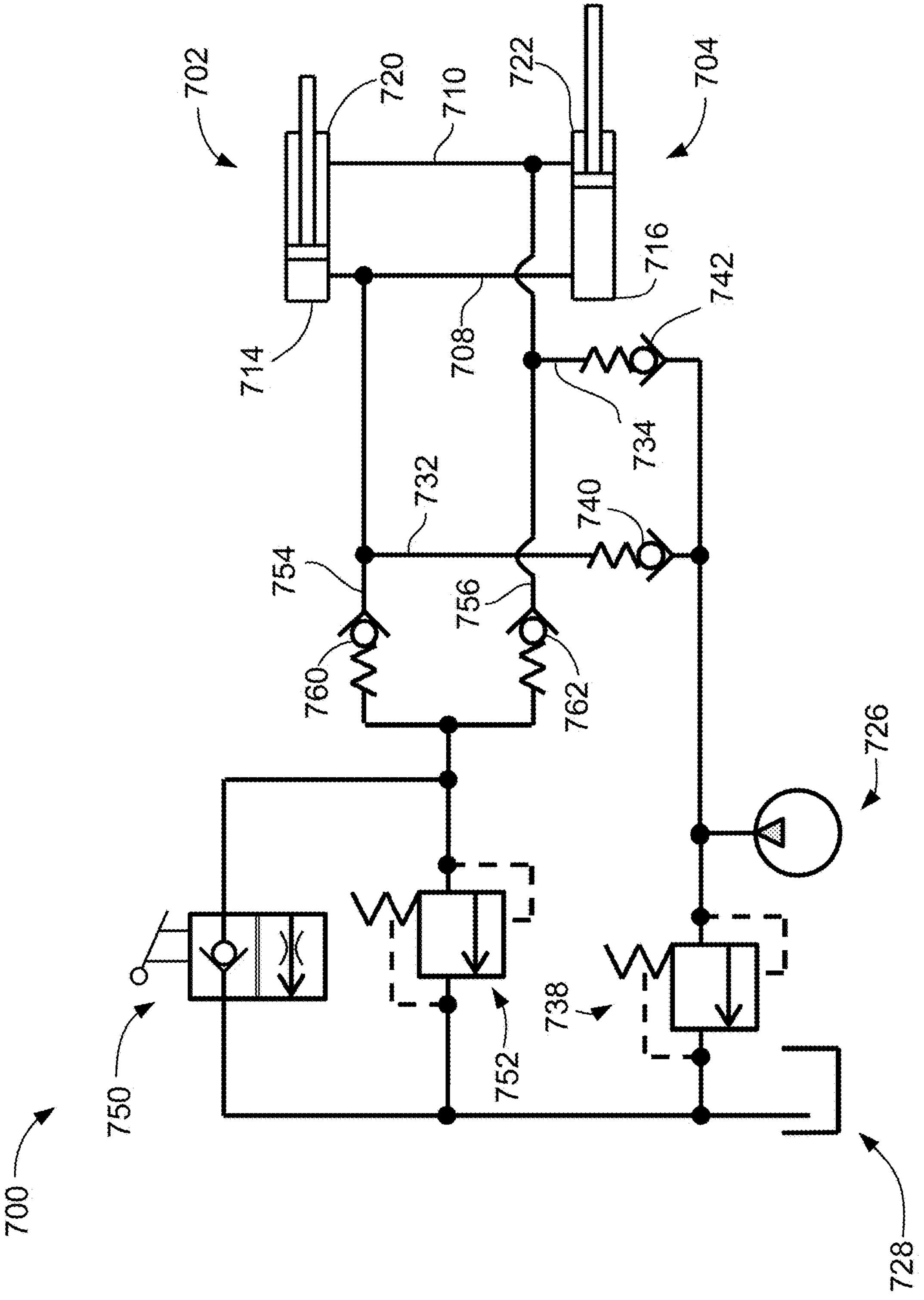

FIG. 14 shows another example hydraulic circuit 700 according to some examples of the disclosure, as can be implemented on power machines such as the type illustrated in FIG. 1, including articulated loaders such as the type illustrated in FIG. 2. The circuit 700 is one particular example of a work actuator circuit of the type illustrated in FIG. 4 and is a particular variation of the isolated hydraulic leveling circuit 302 of FIG. 5A. The hydraulic circuit 700 can provide appropriate control of hydraulic flow for self-leveling systems, including systems similar to those illustrated in FIGS. 5-11 and others. Correspondingly, in some cases, the hydraulic circuit 700 can be used with the lift arm assembly 300 as illustrated in FIGS. 5-11 or other relevant lift arm assemblies.

The hydraulic circuit 700 is generally similar to the hydraulic circuits 500, 600, with components that have similar configurations and purposes being labeled similarly to FIG. 12, but in the "700*s*." Thus, for example, the hydraulic circuit 700 includes a follower cylinder 702, a leveling cylinder 704, check valves 740, 742, etc. and can generally operate similarly to the hydraulic circuit 500 to manage pressure at the follower and leveling cylinders 702, 704 and correct desynchronized operation of the cylinders 702, 704. Similarly, the hydraulic circuit 700 also includes first flow line 708, second flow line 710, charge pump 726, third flow line 732, fourth flow line 734, charge relief valve 738, fifth flow line 754, sixth flow line 756, second base check valve 760, and second rod check valve 762. In some aspects, however, the hydraulic circuit 700 differs from the hydraulic circuits 500, 600. For example, the hydraulic circuit 700 includes a drain valve 750 arranged in parallel with a purge relief valve 752 that sets a maximum pressure for base ends 714, 716 and rod ends 720, 722 of the follower and leveling cylinders 702, 704. The drain valve 750 is configured to be manually operated between a closed state and an open state to selectively and manually release hydraulic fluid or trapped air from the follower and leveling cylinders 702, 704 to the tank 728. In some examples, a purge cylinder (not shown) or an air bleed valve (not shown) can be installed for a similar purpose as the drain valve 750 shown in the hydraulic circuit 700.

Although the examples above focus on hydraulic systems for self-leveling an implement and providing synchronized movement of cylinders, some similar arrangements can be used for other purposes. For example, similar hydraulic circuits can be used to ensure a controlled desynchronized movement of cylinders, such as extension or retraction of one cylinder by a fraction of or excess percentage relative to extension or retraction of another cylinder. In some examples, this controlled desynchronized movement can be implemented using hydraulic circuits that are similar to those of FIGS. 12-14, but also (or alternatively) include other hydraulic elements (such as, e.g., restriction orifices). For example, known hydraulic components, can be used in some cases to provide a ratio of flow for synchronized movement and can be used in other cases to provide a ratio of flow for desynchronized movement. Correspondingly, some examples can include one or more fixed orifices or variable orifices that can be adjusted to provide desired pressure drops for particular operating conditions.

Some discussion above focuses on control and synchronization of sets of follower and leveling cylinders (e.g., the follower and leveling cylinders 352, 374 of FIG. 7) for control of single implements or implement carriers. In some examples, however, the disclosed hydraulic circuits, such as the hydraulic circuit 500 of FIG. 12, can be configured to control multiple implements or actuators, to form a part of larger hydraulic assemblies, to control synchronization of other arrangements of actuators, or to otherwise operate in other applications. For example, variations on the hydraulic circuit 500 can be configured to control work actuators other than the follower and tilt cylinders 502, 504 on any variety of power machines.

Although the present invention has been described with reference to preferred examples, workers skilled in the art will recognize that changes may be made in form and detail to the disclosed examples without departing from the spirit and scope of the concepts discussed herein.

What is claimed is:

1. A lift arm assembly comprising:

a lift arm that is pivotally secured at a first end to a main frame of a power machine;

an implement carrier that is pivotally secured to a second end of the lift arm;

a lift cylinder that is pivotally secured at a first end to the lift arm and pivotally secured at a second end to the main frame, so that extending or retracting the lift cylinder raises or lowers the lift arm;

a leveling link that is pivotally secured at a first end to the lift arm;

a tilt cylinder that is pivotally secured at a first end to the implement carrier and pivotally secured at a second end to the leveling link, so that operation of the tilt cylinder causes the implement carrier to pivot relative to the lift arm; and an isolated hydraulic circuit that includes:

a follower cylinder that is pivotally secured at a first end to the lift arm and pivotally secured at a second end to the main frame, so that the follower cylinder is mechanically synchronized with the lift cylinder;

a leveling cylinder that is pivotally secured at a first end to the lift arm and pivotally secured at a second end to the leveling link;

a first conduit providing hydraulic flow between a base end of the follower cylinder and a base end of the leveling cylinder; and a second conduit providing hydraulic flow between a rod end of the follower cylinder and a rod end of the leveling cylinder, wherein movement of the follower and leveling cylinders is hydraulically synchronized by flow through the first and second conduits.

2. The lift arm assembly of claim 1, wherein the leveling cylinder and the tilt cylinder are pivotally secured to the leveling link along a common pivot axis.

3. The lift arm assembly of claim 1, wherein the isolated hydraulic circuit causes the leveling cylinder to extend when the follower cylinder retracts, and to retract when the follower cylinder extends.

4. The lift arm assembly of claim 1, wherein the leveling link, the leveling cylinder, and the implement carrier are pivotally secured to the second end of the lift arm at two or more pivot axes; and wherein, along the lift arm, the first end of the lift cylinder and the first end of the follower cylinder are pivotally secured to the lift arm between the main frame and the two or more pivot axes at the second end of the lift arm.

5. The lift arm assembly of claim 4, wherein the first end of the follower cylinder is pivotally secured to the lift arm with a common pivot axis with the first end of the lift cylinder.

6. The lift arm assembly of claim 4, wherein the first end of the follower cylinder is pivotally secured to the lift arm between the first end of the lift cylinder and the first end of the lift arm.

7. The lift arm assembly of claim 1, wherein, with the lift arm in a fully lowered position, an elongate direction of the leveling link extends, from the first end of the leveling link to the second end of the leveling link, away from the implement carrier.

8. The lift arm assembly of claim 7, wherein, the hydraulically synchronized movement of the follower and leveling cylinders causes the second end of the leveling link to pivot about the first end of the leveling link toward the second end of the lift arm as the lift arm is raised from the fully lowered position.

9. The lift arm assembly of claim 8, wherein, over a range of movement of the lift arm between the fully lowered position and a fully raised position, the elongate direction of the leveling link maintains an acute angle relative to an elongate direction of the lift arm that extends between the first and second ends of the lift arm.

10. The lift arm assembly of claim 9, wherein the first end of the leveling link is pivotally secured to a lower side of the lift arm; and wherein the tilt cylinder and the leveling cylinder are pivotally secured to the leveling link at a second end of the leveling link that extends above the lift arm.

11. The lift arm assembly of claim 1, wherein the leveling link is pivotally secured to a lower side of the lift arm;

wherein the implement carrier is pivotally secured to the lower side of the lift arm; and wherein the leveling cylinder is pivotally secured to an upper side of the lift arm.

12. The lift arm assembly of claim 1, wherein the leveling cylinder and the implement carrier are pivotally secured to the lift arm along a common pivot axis.

13. The lift arm assembly of claim 1, wherein the isolated hydraulic circuit further includes a drain valve configured to selectively release fluid from the leveling and follower cylinders.

14. The lift arm assembly of claim 1, wherein the tilt cylinder is configured to pivot the implement carrier relative to the lift arm so that the implement carrier operates as a first bell crank; and wherein the leveling cylinder is configured to pivot the leveling link relative to the lift arm so that the leveling link operates as a second bell crank.

15. The lift arm assembly of claim 14, wherein extension of the tilt cylinder causes the implement carrier, as the first bell crank, to pivot in a first rotational direction; and wherein extension of the leveling cylinder, by retraction of the follower cylinder, causes the leveling link, as the second bell crank, to pivot opposite the first rotational direction.

16. A lift arm assembly comprising:

a lift arm that is pivotally secured to a main frame of a power machine;

a lift cylinder that is pivotally secured at a first end to the lift arm and pivotally secured at a second end to the main frame, so that extending or retracting the lift cylinder raises or lowers the lift arm;

a follower cylinder that is pivotally secured at a first end to the lift arm and pivotally secured at a second end to the main frame, so that the follower cylinder is mechanically synchronized with the lift cylinder;

a first bell crank arrangement supported by the lift arm, the first bell crank arrangement including:

the lift arm;

a leveling link that is pivotally secured at a first end to the lift arm; and a leveling cylinder that is hydraulically synchronized with the follower cylinder, pivotally secured at a first end to the lift arm, and pivotally secured at a second end to a second end of the leveling link, so that operation of the leveling cylinder, as caused by operation of the follower cylinder, causes the leveling link to pivot relative to the lift arm; and a second bell crank arrangement supported by the lift arm, the second bell crank arrangement including:

the lift arm, the leveling link, and the leveling cylinder, collectively;

an implement carrier that is pivotally secured to a second end of the lift arm; and a tilt cylinder that is pivotally secured at a first end to the implement carrier and pivotally secured at a second end to the second end of the leveling link, so that operation of the tilt cylinder causes the implement carrier to pivot relative to the lift arm, the leveling link, and the leveling cylinder, collectively.

17. The lift arm assembly of claim 16, wherein the leveling cylinder of the first bell crank arrangement and the tilt cylinder of the second bell crank arrangement are pivotally secured to the leveling link along a common pivot axis.

18. A power machine comprising:

a main frame;

a power source;

a hydraulic work circuit, configured to power hydraulic operations with one or more pumps, using power from the power source;

a lift arm structure that includes:

a main lift arm portion pivotally secured at a first end to a main frame of a power machine;

an extendable lift arm portion that is slidably supported by the main lift arm portion for extension and retraction relative to the main lift arm portion; and an implement carrier that is pivotally secured to a second end of the extendable lift arm portion;

a lift cylinder that is pivotally secured at a first end to the main lift arm portion and pivotally secured at a second end to the main frame, so that extension or retracting the lift cylinder raises or lowers the lift arm structure;

a leveling link that is pivotally secured at a first end to the extendable lift arm portion;

a tilt cylinder that is pivotally secured at a first end to the implement carrier and pivotally secured at a second end to a second end of the leveling link, so that operation of the tilt cylinder causes the implement carrier to pivot relative to the extendable lift arm portion;

a follower cylinder that is pivotally secured at a first end to the main lift arm portion and pivotally secured at a second end to the main frame, so that the follower cylinder is mechanically synchronized with the lift cylinder; and a leveling cylinder that is hydraulically synchronized with the follower cylinder, pivotally secured at a first end to the extendable lift arm portion, and pivotally secured at a second end to the second end of the leveling link, so that operation of the lift cylinder by the one or more pumps causes synchronized operation of the leveling cylinder.

19. The power machine of claim 18, wherein, for an entire operational range of motion of the extendable lift arm portion between a fully retracted position and a fully extended position: one or more locations at which the leveling link, the leveling cylinder, and the implement carrier are pivotally secured to the extendable lift arm portion are positioned beyond a second end of the main lift arm portion, relative to a direction from the first end of the main lift arm portion toward the second end of the main lift arm portion.

20. The power machine of claim 19, wherein the leveling link is formed from a first side plate and a second side plate that collectively pivotally support the leveling cylinder and the tilt cylinder; and wherein a torque tube extends between the first and second side plates and, with the lift arm structure in a fully lowered configuration, the torque tube is one or more of:

between the main lift arm portion and the leveling and tilt cylinders; or one of rearward of or intersected by a line of action of the leveling link that extends between the pivotally secured first and second ends of the leveling link.

21. A hydraulic system for a lift arm assembly, the hydraulic system comprising:

a flow source;

a follower cylinder;

a leveling cylinder;

a base-end hydraulic flow path between a base end of the follower cylinder and a base end of the leveling cylinder;

a rod-end hydraulic flow path between a rod end of the follower cylinder and a rod end of the leveling cylinder;

a first outlet hydraulic flow path extending from the base-end hydraulic flow path; and a second outlet hydraulic flow path extending from the rod-end hydraulic flow path;

wherein the first and second outlet hydraulic flow paths connect the base-end and rod-end hydraulic flow paths, respectively, to tank, via one or more pressure relief valves;

wherein the flow source provides charge hydraulic flow to the base-end hydraulic flow path via the first outlet hydraulic flow path and a first one-way valve; and wherein the flow source provides charge hydraulic flow to the rod-end hydraulic flow path via the second outlet hydraulic flow path and a second one-way valve.

22. The hydraulic system of claim 21, wherein the first and second outlet hydraulic flow paths connect the base-end and rod-end hydraulic flow paths to tank via a shared pressure relief valve.

23. The hydraulic system of claim 21, wherein the follower cylinder, the leveling cylinder, the base-end hydraulic flow path, and the rod-end hydraulic flow path form part of an isolated hydraulic circuit configured to extend and retract the leveling cylinder based on movement of the follower cylinder.

24. The hydraulic system of claim 21, further comprising:

a third one-way valve along the first outlet hydraulic flow path, an inlet of the hydraulic flow from the flow source into the first outlet hydraulic flow path being upstream of the third one-way valve, relative to flow to tank; and a fourth one-way valve along the second outlet hydraulic flow path, an inlet of the hydraulic flow from the flow source into the second outlet hydraulic flow path being upstream of the fourth one-way valve, relative to flow to tank.

25. The hydraulic system of claim 24, wherein the one or more pressure relief valves include at least one pressure relief valve that receives flow from and regulates pressure within each of the first and second outlet hydraulic flow paths.

26. The hydraulic system of claim 25, further comprising a drain valve configured to selectively release fluid from the follower and leveling cylinders to bypass at least one of the one or more pressure relief valves.

27. A hydraulic system for a lift arm assembly, the hydraulic system comprising:

an isolated hydraulic circuit that includes:

a follower cylinder;

a leveling cylinder;

a first conduit directly connecting a base end of the follower cylinder and a base end of the leveling cylinder; and a second conduit directly connecting a rod end of the follower cylinder and a rod end of the leveling cylinder;

a first hydraulic arrangement that connects the first conduit to a flow source and to tank; and a second hydraulic arrangement that connects the second conduit to the flow source and to tank.

* * * * *